(12) United States Patent
Watanabe

(10) Patent No.: US 10,739,527 B2
(45) Date of Patent: Aug. 11, 2020

(54) MINIATURE ADAPTER FOR MPO PLUG

(71) Applicant: SANWA DENKI KOGYO CO., LTD., Tokyo (JP)

(72) Inventor: Yasuhiro Watanabe, Tokyo (JP)

(73) Assignee: SANWA DENKI KOGYO CO., LTD., Tokyo (JP)

(*) Notice: Subject to any disclaimer, the term of this patent is extended or adjusted under 35 U.S.C. 154(b) by 0 days.

(21) Appl. No.: 16/278,806

(22) Filed: Feb. 19, 2019

(65) Prior Publication Data

US 2019/0317281 A1    Oct. 17, 2019

(30) Foreign Application Priority Data

Apr. 16, 2018    (JP) ................................ 2018-078367

(51) Int. Cl.
*G02B 6/38*    (2006.01)

(52) U.S. Cl.
CPC ......... *G02B 6/3825* (2013.01); *G02B 6/3831* (2013.01); *G02B 6/3893* (2013.01)

(58) Field of Classification Search
CPC ... G02B 6/3825; G02B 6/3831; G02B 6/3893
USPC ........................................................ 385/53
See application file for complete search history.

(56) References Cited

U.S. PATENT DOCUMENTS

| | | | |
|---|---|---|---|
| 2015/0301286 A1* | 10/2015 | Chan ................... | G02B 6/3825 385/56 |
| 2016/0062051 A1* | 3/2016 | Taira ................... | G02B 6/3825 385/56 |
| 2017/0227719 A1* | 8/2017 | Zimmel ............... | G02B 6/3879 |
| 2017/0285272 A1* | 10/2017 | Burek .................. | G02B 6/3825 |

FOREIGN PATENT DOCUMENTS

JP    2016053711 A    4/2016

* cited by examiner

*Primary Examiner* — Jerry M Blevins
(74) *Attorney, Agent, or Firm* — Bacon & Thomas, PLLC

(57) ABSTRACT

The invention provides a miniature adapter for MPO plug which can make the adapter small to the limit so as to be the same size as a plug, can be mounted at a high density without any restriction in an arrangement place and can be manufactured with a simple structure at a low cost. An adapter main body is formed into a tubular shape by upper and lower wall portions which are approximately flush with upper and lower wall portions of a coupling, and left and right wall portions which are approximately flush with left and right wall portions of the coupling, and is provided in both front and rear ends of the left and right wall portions of the adapter main body with elastic locking portions which are provided so as to face to a side of plug insertion and removal opening portions.

10 Claims, 20 Drawing Sheets

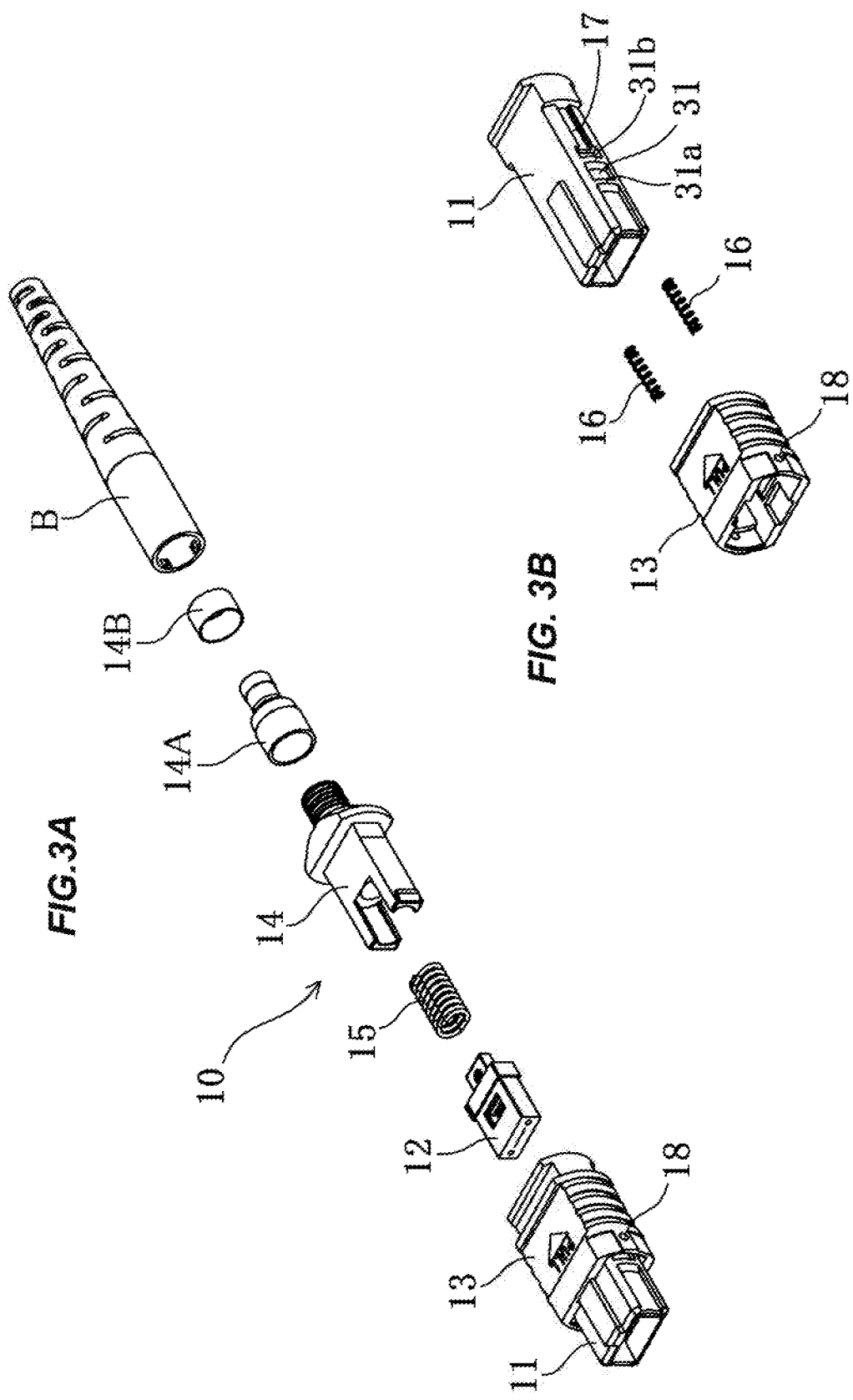

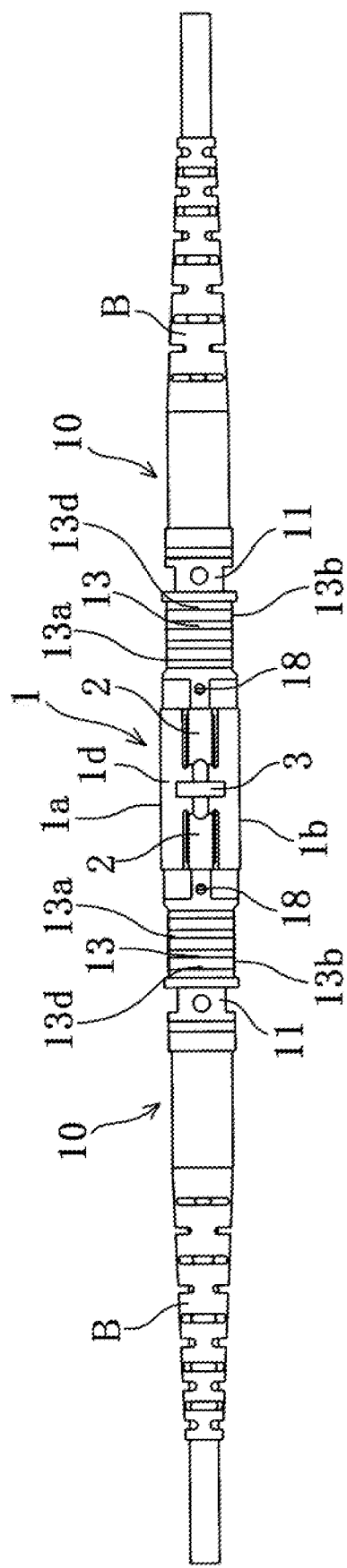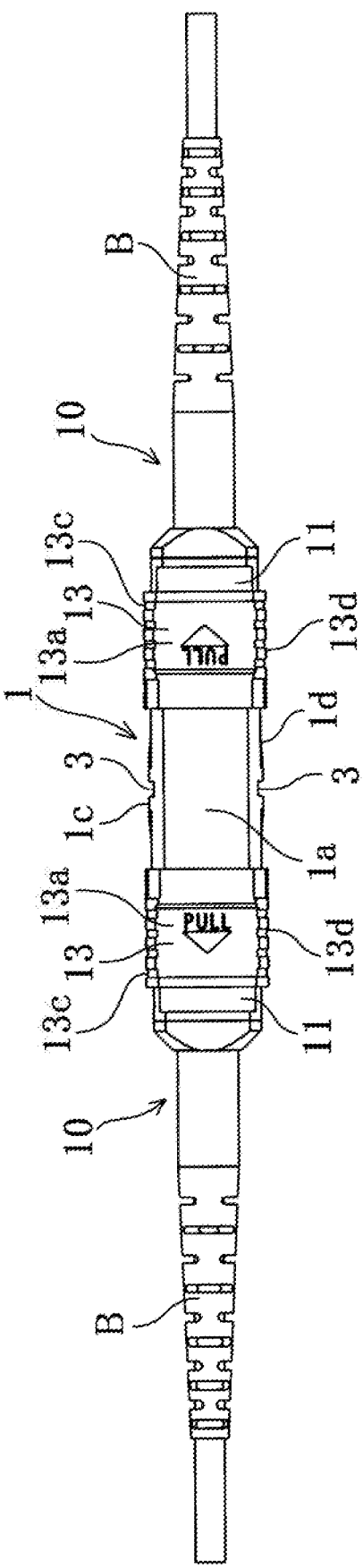

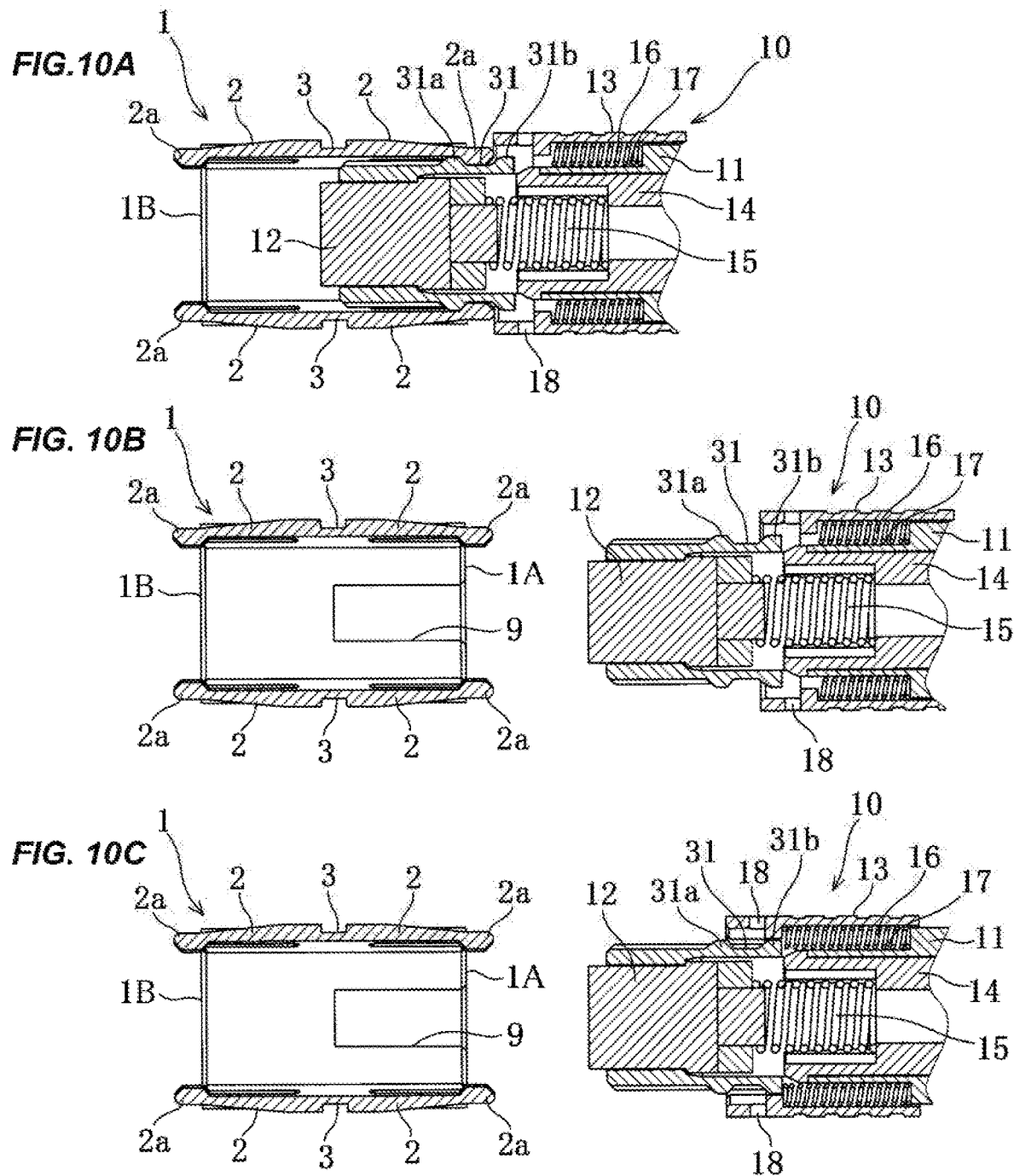

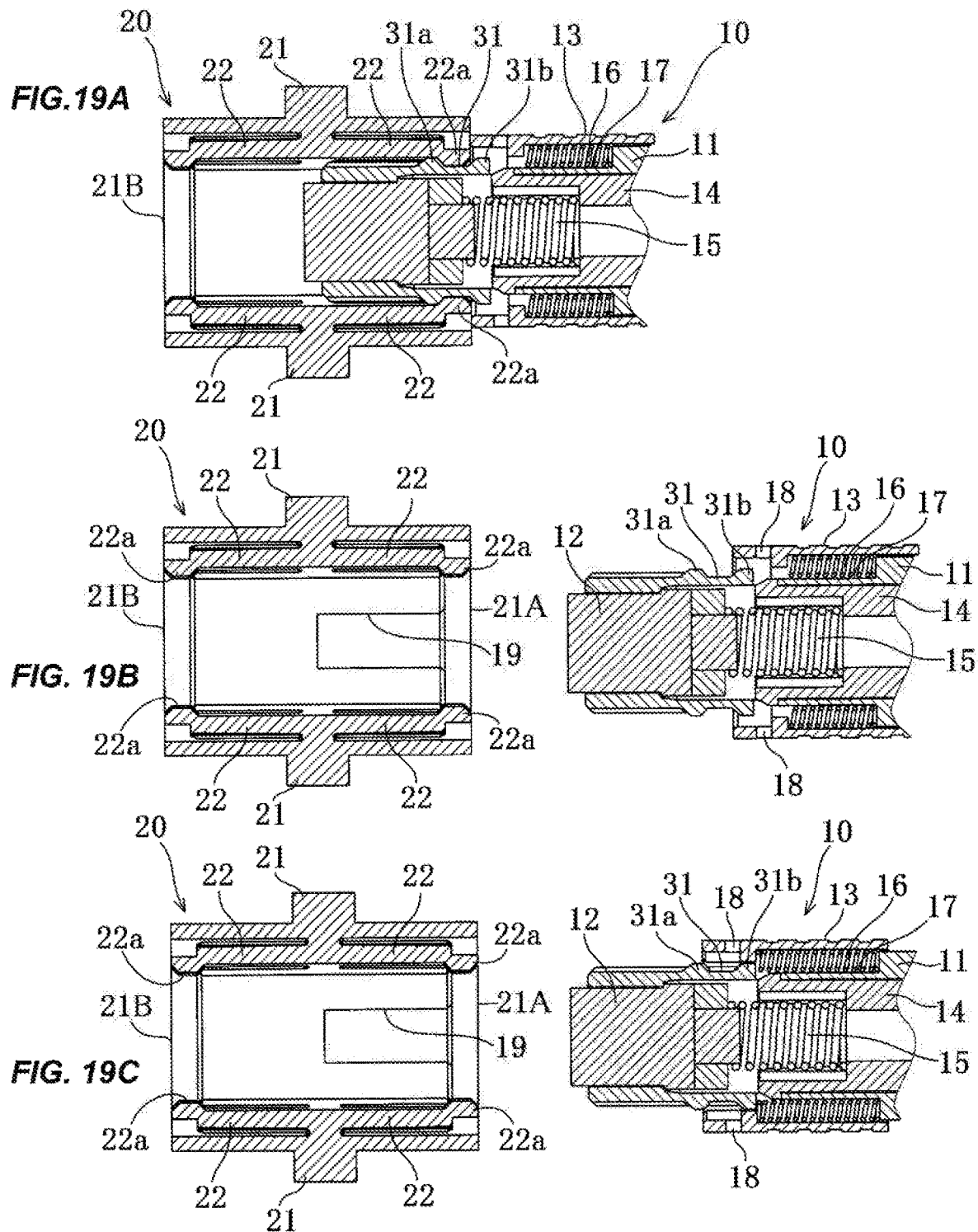

MINIATURE ADAPTER FOR MPO PLUG

TECHNICAL FIELD

The present invention relates to a miniature adapter for MPO plug according to a compact and simple structure for interconnecting optical connector plugs (hereinafter, abbreviated to plug main bodies) on the basis of an MPO type push-pull system.

BACKGROUND ART

In recent years, densification of a communication device has been essential in various data centers, and an aspect that a plurality of optical fiber core wires are mounted to one of the plug main bodies has become accordingly used widely.

Further, in view of improvement of a connecting workability in an optical connector ferrule, there has been provided a so-called MPO connector (an optical connector structured such that a multi-core optical connector ferrule defined by JIS-C5982 standard is stored in an inner portion of a plastic housing), in recent years.

Conventionally, as shown in FIGS. 17A to 17D and FIGS. 18A to 18C, an adapter main body 20 is formed into an approximately rectangular parallelepiped polygonal tubular shape, elastic locking portions 22 are integrally provided in both front and rear ends of right and left inner walls thereof so as to protrude in a facing manner toward plug insertion and removal opening portions 21A and 21B which are communicated back and forth. Both optical fiber core wires are optically connected by insertion of plug main bodies respectively into the plug insertion and removal opening portions 21A and 21B, as shown in FIGS. 20A and 20B.

Further, a key groove 19 with which a key projection (not shown) in the plug main body 10 side mentioned later engages is formed along a sliding direction of the plug main body 10, at the center of an inner surface of a lower wall portion in one plug insertion and removal opening portion 21A of the adapter main body 20, and at the center of an inner surface of an upper wall portion in the other plug insertion and removal opening portion 21B.

Further, approximately at the centers of both the right and left side surfaces of the adapter main body 20, there are formed locking projections 21 for locking the adapter main body 20 to an opening edge portion of a mounting opening portion for a panel when mounting to the mounting opening portion for the panel (not shown).

In the meanwhile, an MPO type plug main body 10 stores a ferrule 12 attached to a front end of an optical fiber tape core wire (not shown), in a front end (a forward end) of a sleeve-shaped housing 11, as shown in FIGS. 19A to 19C. Further, a spring 15 elastically biasing the ferrule 12 to a forward side of the plug main body 10 is provided within the housing 11.

Further, it is provided with a tubular coupling 13 which is outward inserted into a recess 17 formed in the housing 11, is arranged so as to be slidable in a range of movement secured in relation to the housing 11 in an axial direction thereof, and is elastically biased to a forward side of the plug main body 10 by a spring 16, and a spring push 14 which is mounted to an opposite rear end portion to a front end where the ferrule 12 of the housing 11 is arranged, and locks and supports a rear end of the spring 15.

Further, small holes 18 for inserting a pin (not shown) are provided in bilaterally symmetrical positions in a front end side of the coupling 13, and the coupling 13 can be disassembled from the housing by simultaneously inserting both pins of a clamp-shaped pin tool (not shown) having a pair of pins into the respective small holes 18.

The insertion of the plug main body 10 into the adapter main body 20 is achieved by a worker's operation of pressing a portion which is positioned in a rear side of the coupling 13 in the plug main body 10, for example, the housing 11 or a boot B, as shown in FIGS. 19A to 19C.

In the meanwhile, the removal of the plug main body 10 from the adapter main body 20 is achieved by pulling in the coupling 13 rearward against an elastic biasing force of the spring 16.

More specifically, as shown in FIGS. 19A to 19C, a front end of the coupling 13 is pressed by an elastic locking portion 22 and is once moved backward by inserting a front end side of the housing 11 in the plug main body 10 into the plug insertion and removal opening portion 21A of the adapter main body 20. The housing 11 is provided with a pair of front and rear locking convex portions 31a and 31b in a protruding manner via a catch portion 31 arranged in a front end thereof, and the elastic locking portion 22 tightly eats into the catch portion 31 so as to be locked after a locking projection 22a formed in a front end inner surface thereof climbs over the front side locking convex portion 31a.

Further, the coupling 13 slides and returns forward since the coupling 13 is always biased to a front side of the plug main body 10 by a spring 16, and an outer surface of the elastic locking portion 22 is coated and retained by the front end inner surface of the coupling 13 and disenables removal of the housing 11.

When removing the plug main body 10, the coupling 13 is slid rearward in a state in which the locking projection 22a of the elastic locking portion 22 is engaged with the catch portion 31 of the housing 11. At this time, the catch 31 in a state in which the locking projection 22a is engages is exposed. Consequently, the locking projection 22a engaged with the catch portion 31 of the housing 11 climbs over the locking convex portion 31a by pulling out the plug main body 10. Further, at the same time that the locking projection 22 is released from a gap between the housing 11 and the coupling 13, the coupling 13 slides and returns forward by the spring 16, and the front end of the coupling 13 covers the catch portion 31a.

Further, as shown in patent literature 1, there has been known an optical connector adapter with shutter, including an adapter main body which is formed into an approximately rectangular parallelepiped shape, a plug insertion and removal hole which is formed in a penetrating manner in the adapter main body, a pair of latch members which are mounted to an inner surface of the plug insertion and removal hole so as to be spaced at an interval in a width direction of the adapter main body, a pair of latch member mounting grooves which are formed in an inner surface of the plug insertion and removal hole so as to be spaced at an interval in the width direction of the adapter main body, a penetration portion which is formed in a lower surface of the adapter main body in a thickness direction so as to be communicated with the plug insertion and removal hole, a window member which is mounted to the penetration portion, a shutter plate which is arranged in the plug insertion and removal hole, and a stopper fitting which is installed to an outer surface of the adapter main body.

CITATION LIST

Patent Literature

PATENT LITERATURE 1: Japanese Unexamined Patent Application Publication No. 2016-537111

SUMMARY OF INVENTION

Technical Problem

However, a size around a body (a vertical and transverse width dimension) of the adapter main body 20 is conventionally greater than a size around a body (a vertical and transverse width dimension) of the plug main body 10 (the coupling 13). More specifically, since the adapter main body 20 protrudes outward from the plug main body 10 (the coupling 13) at a thickness of the adapter main body 20 in a vertical and transverse direction as shown in FIGS. 20A and 20B, the interval between the adapter main bodies 20 adjacent to each other becomes narrowed at the high-density mounting to the panel. As a result, there is a problem that an arrangement place is restricted.

In order to do away with the restriction mentioned above, it is necessary to make the adapter main body 20 small to the limit, and set it to the same size as the plug main body 10. However, since the elastic locking portions 22 of the housing 11 are provided in the right and left inner walls of the adapter main body 20 in a facing manner so as to be protruded toward the plug insertion and removal opening portions 21A and 21B as mentioned above, it is structurally impossible to make the adapter main body 20 small to the limit as mentioned above.

Further, the patent literature 1 mentioned above has a pair of latch members which are mounted to the inner surface of the plug insertion and removal hole so as to be spaced at the interval in the width direction of the adapter main body, and a pair of latch member mounting grooves which are formed in the inner surface of the plug insertion and removal hole so as to be spaced at the interval in the width direction of the adapter main body. As a result, the patent literature 1 is constructed by a combination of the latch member and the adapter main body. Therefore, the latch member itself is a different member which is independent from the adapter main body, and there is a problem that the structure is complicated due to the combination of two parts on the manufacturing, and a manufacturing cost is increased.

Consequently, the present invention is made by taking into consideration the conventionally existing circumstances as mentioned above, and an object of the present invention is to provide a miniature adapter for MPO plug which can make the adapter small to the limit so as to be the same size as a plug, can be mounted at a high density without any restriction in an arrangement place and can be manufactured with a simple structure at a low cost.

Solution to Problem

In order to achieve the object mentioned above, according to the present invention, there is provided a miniature adapter for MPO plug formed by an adapter main body having a plug insertion and removal opening portion provided for interconnecting a plug main body and communicating back and forth, the plug main body comprising as primary members a spring push which is provided in a rear end portion of the plug main body, a coupling which is mounted to the plug main body so as to be slidable back and forth in a forward side of the spring push, and a spring which elastically biases the coupling to a forward side of the plug main body, wherein the adapter main body is formed into a tubular shape by upper and lower wall portions which are approximately flush with the upper and lower wall portions of the coupling, and right and left wall portions which are approximately flush with the right and left wall portions of the coupling, and is provided in both front and rear ends of the right and left wall portions of the adapter main body with elastic locking portions which are provided so as to face to the plug insertion and removal opening portion side, and wherein the locking of the adapter main body in relation to the elastic locking portion is retained by a forward movement of the coupling in dependence on an elastic biasing force of the spring to the forward side of the plug main body, and the locking of the adapter main body in relation to the elastic locking portion is disengaged by a rearward movement of the spring against the elastic biasing force to the forward side of the plug main body, thereby capable of getting out.

The elastic locking portion of the adapter main body is structured such that a locking projection is formed on a front end inner surface thereof, a catch portion formed into a concave groove shape between a pair of front and rear locking convex portions is provided in a protruding manner in a front end of the plug main body, and the locking projection formed in the front end inner surface of the elastic locking portion eats into and locked to the catch portion which is exposed by the coupling front end pressed by the elastic locking portion against the elastic biasing force of the spring to the forward side of the plug main body after climbing over the locking convex portion in the forward side, on the basis of a forced insertion of the plug main body into the adapter main body.

Vertical groove-shaped notch portions are provided at the centers of outer surface portions of the right and left wall portions in the adapter main body, the vertical groove-shaped notch portions fitting to a predetermined insertion position of a panel for mounting at a high density.

The notch portions are fitted to partition portions of the panel for mounting at the high density, the partition portions being formed into an upward open C-shaped frame shape and provided in a rising manner at uniform intervals.

The adapter main body is structured such that a key groove with which a key projection in the plug main body side engages is formed to an inside center portion of the adapter main body along a sliding direction of the plug main body, at the center of an inner surface of a lower wall portion of the one plug insertion and removal opening portion and the center of an inner surface of an upper wall portion of the other plug insertion and removal opening portion, the key projection of the plug main body has the same length as that of the key groove, a front end of the key projection is locked to a rear end of the key groove, and the plug main body is arranged at a predetermined position of the adapter main body.

A polygonal tubular adapter cover having an accommodation portion in its inner portion is provided, and the adapter main body is stored and arranged at a predetermined position of the accommodation portion of the adapter cover.

The adapter main body is integrally formed by a plastic member which is a thin plate, has elasticity and has light weight.

Effect of the Invention

According to the present invention, it is possible to make the adapter small to the limit so as to be the same size as the plug, to manufacture at a low cost with a simple structure which can achieve a high density mounting without any restriction in an arrangement place, and to construct various plug security systems.

More specifically, the present invention provides the miniature adapter for MPO plug formed by the adapter main body having the plug insertion and removal opening portion provided for interconnecting the plug main body and communicating back and forth, the plug main body comprising as the primary members the spring push which is provided in the rear end portion of the plug main body, the coupling which is mounted to the plug main body so as to be slidable back and forth in the forward side of the spring push, and the spring which elastically biases the coupling to the forward side of the plug main body, the adapter main body is formed into the tubular shape by the upper and lower wall portions which are approximately flush with the upper and lower wall portions of the coupling, and the right and left wall portions which are approximately flush with the right and left wall portions of the coupling, and is provided in both front and rear ends of the right and left wall portions of the adapter with the elastic locking portions which are provided so as to face to the plug insertion and removal opening portion side, the locking of the adapter main body in relation to the elastic locking portion is retained by the forward movement of the coupling in dependence on the elastic biasing force of the spring to the forward side of the plug main body, and the locking of the adapter main body in relation to the elastic locking portion is disengaged by the rearward movement of the spring against the elastic biasing force to the forward side of the plug main body, thereby capable of getting out. As a result, it is possible to make the adapter main body small to the limit so as to be the same size as the plug main body, and to manufacture at a low cost with a simple structure which can achieve a high density mounting without any restriction in an arrangement place. For example, even in the case that the piping is a narrow pipe when wiring an inner portion of the piping, it is possible to easily wire the inner portion of the pipe. Further, it is possible to prevent a cord of the plug main body from being caught by the adapter main body when winding and storing within the storage box. Further, it is possible to downsize various relay boxes which seal (cover) an entire of an optically connected portion between the plug main bodies via the adapter main body.

The elastic locking portion of the adapter main body is structured such that the locking projection is formed on the front end inner surface thereof, and the locking projection eats into and locked to the catch portion of the plug main body which is exposed by the coupling front end pressed by the elastic locking portion against the elastic biasing force of the spring to the forward side of the plug main body, on the basis of the forced insertion of the plug main body into the adapter main body. As a result, it is possible to easily and securely achieve a sliding motion of the coupling and it is possible to smoothly achieve a locking operation of pressing the plug main body into the adapter main body even in the case that the adapter main body is made small to the limit so as to be the same size as the plug main body. Further, it is possible to smoothly get out the plug main body in relation to the adapter main body.

The catch portion is formed into the concave groove shape between a pair of locking convex portions which are provided in a protruding manner at the front end of the plug main body, and the elastic locking portion is structured such as to eat into and be locked to the catch portion after the locking projection formed on the front end inner surface thereof climbs over the locking convex portion in the forward side. As a result, it is possible to securely prevent the plug main body from being carelessly detached from the adapter main body even in the case that the adapter main body is made small to the limit so as to be the same size as the plug main body.

The vertical groove-shaped notch portions are provided at the centers of the outer surface portions of the right and left wall portions in the adapter main body, the vertical groove-shaped notch portions fitting to the predetermined insertion position of the panel for mounting at a high density. As a result, it is possible to smoothly mount the adapter main body to the panel in a high-density state.

The notch portions are fitted to the partition portions of the panel for mounting at the high density, the partition portions being formed into the upward open C-shaped frame shape and provided in a rising manner at the uniform intervals. As a result, the adapter main bodies can be securely retained by the partition portions without the adjacent adapter main bodies being an obstacle even in the case that the adapter main bodies are mounted to the panel in the high-density state.

The adapter main body is structured such that the key groove with which the key projection in the plug main body side engages is formed along the sliding direction of the plug main body, at the center of the inner surface of the lower wall portion of the one plug insertion and removal opening portion and the center of the inner surface of the upper wall portion of the other plug insertion and removal opening portion. As a result, it is possible to previously avoid an erroneous insertion of the plug main body into the adapter main body.

The key groove of the adapter main body is formed to the inside center position of the adapter main body, the key projection of the plug main body has the same length as that of the key groove, the front end of the key projection is locked to the rear end of the key groove, and the plug main body is arranged at the predetermined position of the adapter main body. As a result, it is possible to securely achieve the optical connection between the plug main bodies even in the case that the adapter main body is made small to the limit so as to be the same size as the plug main body.

The polygonal tubular adapter cover having the accommodation portion in its inner portion is provided, and the adapter main body is stored and arranged at the predetermined position of the accommodation portion of the adapter cover. As a result, it is possible to use as a normal adapter which is formed into an approximately rectangular parallelepiped polygonal tubular shape and is provided in both front and rear ends of the right and left inner walls thereof with the elastic locking portions in a protruding manner so as to face each other toward the plug insertion and removal opening portions communicating back and forth.

The adapter main body is integrally formed by the plastic member which is the thin plate, has the elasticity and has the light weight. As a result, it is possible to make the adapter main body small to the limit, and the adapter main body can be preferably utilized for the panel for mounting at the high density.

BRIEF DESCRIPTION OF DRAWINGS

FIGS. 1A, 1B, 1C and 1D show an embodiment of an adapter main body according to the present invention, in which FIG. 1A is a plan view, FIG. 1B is a side elevational view, FIG. 1C is a front elevational view and FIG. 1D is a back elevational view.

FIGS. 2A, 2B and 2C show the embodiment of the adapter main body, in which FIG. 2A is a perspective view, FIG. 2B is a cross sectional view along a line X-X in FIG. 1A, and FIG. 2C is a cross sectional view along a line Y-Y in FIG. 1B.

FIGS. 3A and 3B show an embodiment of a plug main body, in which FIG. 3A is an exploded perspective view of a whole, and FIG. 3B is an exploded perspective view of a coupling and a housing.

FIGS. 4A and 4B show a used state of an adapter main body according to the present invention, in which FIG. 4A is a side elevational view, and FIG. 4B is a plan view.

FIGS. 5A, 5B, 5C, 5D and 5E show an embodiment of a housing of a plug main body, in which FIG. 5A is a plan view, FIG. 5B is a side elevational view, FIG. 5C is a bottom elevational view, FIG. 5D is a front elevational view, and FIG. 5E is a back elevational view.

FIGS. 6A, 6B and 6C show an embodiment of the housing, in which FIG. 6A is a perspective view, FIG. 6B is a cross sectional view along a line A-A in FIG. 5A, and FIG. 6C is a cross sectional view along a line B-B in FIG. 5B.

FIGS. 7A, 7B and 7C show an embodiment of a coupling of a plug main body, in which FIG. 7A is a plan view, FIG. 7B is a side elevational view, and FIG. 7C is a front elevational view.

FIGS. 8A, 8B and 8C show an embodiment of the coupling, in which FIG. 8A is a perspective view, FIG. 8B is a cross sectional view along a line C-C in FIG. 7A, and FIG. 8C is a cross sectional view along a line D-D in FIG. 7B.

FIGS. 9A, 9B and 9C show a step of inserting a plug main body into an adapter main body, in which FIG. 9A is a cross sectional view before the insertion, FIG. 9B is a cross sectional view during the insertion, and FIG. 9C is a cross sectional view after the insertion.

FIGS. 10A, 10B and 10C show a step of removing the plug main body from the adapter main body, in which FIG. 10A is a cross sectional view before the removal, FIG. 10B is a cross sectional view just before the removal, and FIG. 10C is a cross sectional view after the removal.

FIGS. 14A and 14B show an example of a high-density mounting of an adapter main body according to the present invention to a panel, in which FIG. 14A is a perspective view of a state before one adapter main body is attached to the panel, and FIG. 14B is a cross sectional view as seen from a front surface side of the state before one adapter main body is attached to the panel.

FIGS. 15A and 15B show an example of the high-density mounting of the adapter main body according to the present invention to the panel, in which FIG. 15A is a perspective view of a state in which three adapter main bodies are attached to the panel, and FIG. 15B is a cross sectional view as seen from a front surface side of the state in which three adapter main bodies are attached to the panel.

FIGS. 17A, 17B, 17C and 17D show an adapter main body according to a conventional example, in which FIG. 17A is a plan view, FIG. 17B is a side elevational view, FIG. 17C is a front elevational view, and FIG. 17D is a back elevational view.

FIGS. 18A, 18B and 18C show the adapter main body, in which FIG. 18A is a perspective view, FIG. 18B is a cross sectional view along a line E-E in FIG. 17A, and FIG. 18C is a cross sectional view along a line F-F in FIG. 17B.

FIGS. 19A, 19B and 19C show a step of removing a plug main body from an adapter main body according to the conventional example, in which FIG. 19A is a cross sectional view before the removal, FIG. 19B is a cross sectional view just before the removal, and FIG. 19C is a cross sectional view after the removal.

FIGS. 20A and 20B show a used state of the adapter main body according to the conventional example, in which FIG. 20A is a side elevational view, and FIG. 20B is a plan view.

DESCRIPTION OF EMBODIMENTS

Figure 1A:
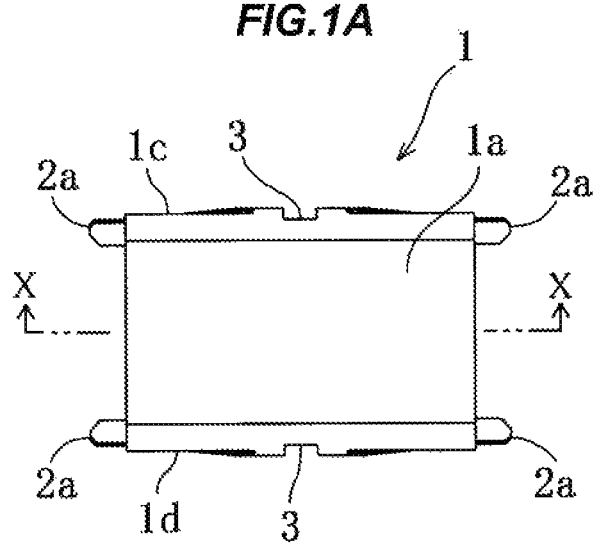
Figure 1B:
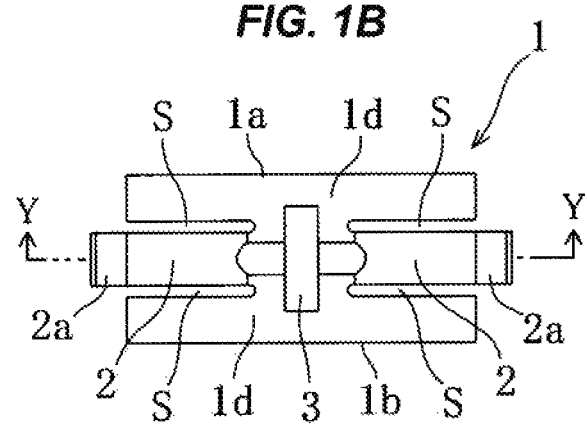
Figure 1C:
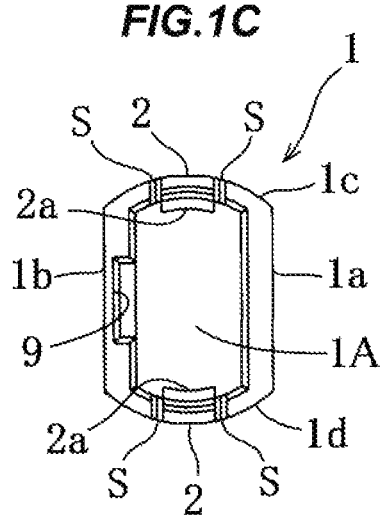
Figure 1D:
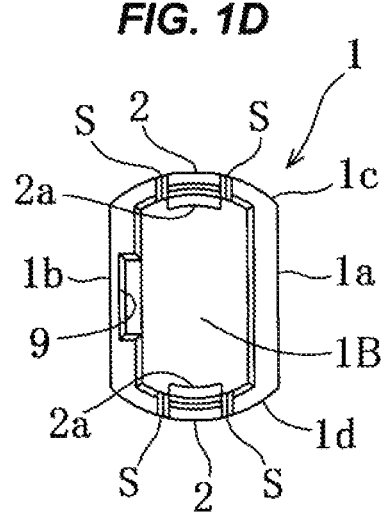

A description will be in detail given below of an embodiment of a miniature adapter for MPO plug according to the present invention with reference to the accompanying drawings.

<Overall Structure of Adapter Main Body>

An adapter main body 1 in the present embodiment is structured, as shown in FIGS. 4A and 4B, such as to interconnect plug main bodies 10 mentioned later according to an MPO type push-pull system, and is constructed so as to be the same size as the plug main bodies 10 in such a manner as to achieve a high-density mounting without any restriction in an arranged location.

More specifically, the adapter main body 1 is provided with plug insertion and removal opening portions 1A and 1B which communicate back and forth, and is formed into a tubular miniature type by upper and lower wall portions 1a and 1b which are approximately flush with upper and lower wall portions 13a and 13b of a coupling 13 in the plug main body 10 mentioned later, and left and right wall portions 1c and 1d which are approximately flush with left and right wall portions 13c and 13d of the coupling 13, respectively, as shown in FIGS. 1A to 1D and FIGS. 2A to 2C. It is desirable that the present adapter main body 1 is a thin plate, has an elasticity and is integrally formed by a light plastic material.

In correspondence to the structure in which the left and right wall portions 13c and 13d of the coupling 13 in the plug main body 10 mentioned later are somewhat curved like an outward circular arc shape, the left and right wall portions 1c and 1d of the adapter main body 1 are somewhat curved like an outward circular arc shape as shown in FIGS. 1A to 1D and FIGS. 2A to 2C.

Further, each of the somewhat curved left and right wall portions 1c and 1d of the adapter main body 1 is provided at upper and lower positions of the plug insertion and removal opening portions 1A and 1B communicating with the front and rear of the adapter main body 1 toward inner sides each other from opening ends of the plug insertion and removal opening portions 1A and 1B with a pair of slits S so as to be spaced at a predetermined distance, and elastic locking portions 2 serving as a pair of latch pieces are integrally formed toward each of the plug insertion and removal opening portions 1A and 1B, the elastic locking portions 2 being cantilevered via the slits S and arranged in front and rear sides of right and left sides so as to be opposed flexibly. More specifically, the elastic locking portion 2 is not provided as an independent body in an outer side or an inner side of the adapter main body 1, but constructs a part of the left and right wall portions 1c and 1d of the adapter main body 1.

Outer surfaces of the elastic locking portions 2 constructing a part of the left and right wall portions 1c and 1d of the adapter main body 1 are also formed flush with an outer surface of the coupling 13, and locking projections 2a each having an approximately trapezoidal cross sectional shape are formed in front end inner surfaces of the elastic locking portions 2.

Further, as shown in FIGS. 1A to 1D, FIGS. 2A to 2C, FIGS. 4A to 4B, FIGS. 9A to 9C and FIGS. 10A to 10C, a notch portion 3 is provided at the center of outer surface portions of the left and right wall portions 1c and 1d of the adapter main body 1, the notch portion 3 being formed into an elongated rectangular groove shape along a vertical direction for fitting to a predetermined insertion position of a panel P for mounting at high density mentioned later.

Figure 2A:
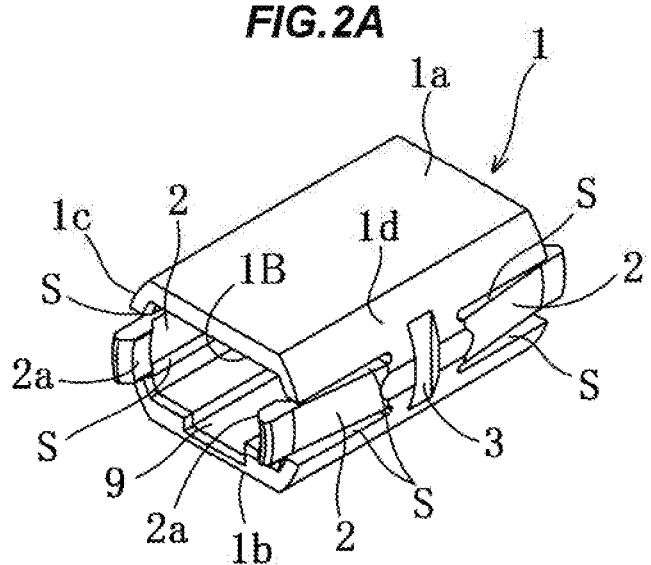
Figure 2B:
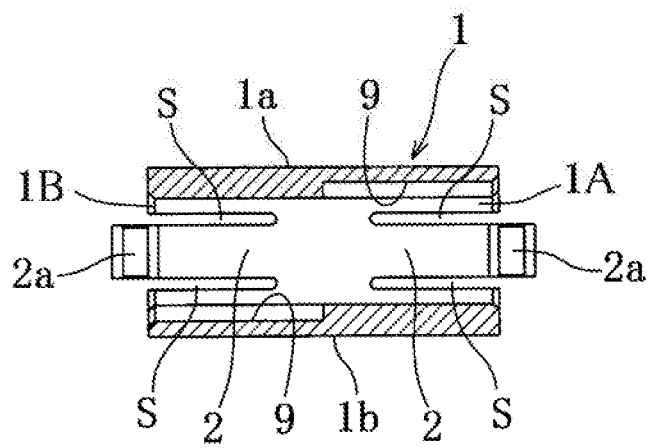
Figure 2C:
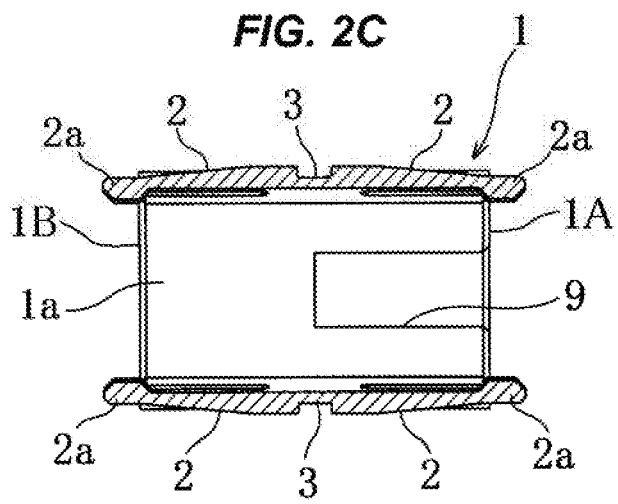
Figure 5A:
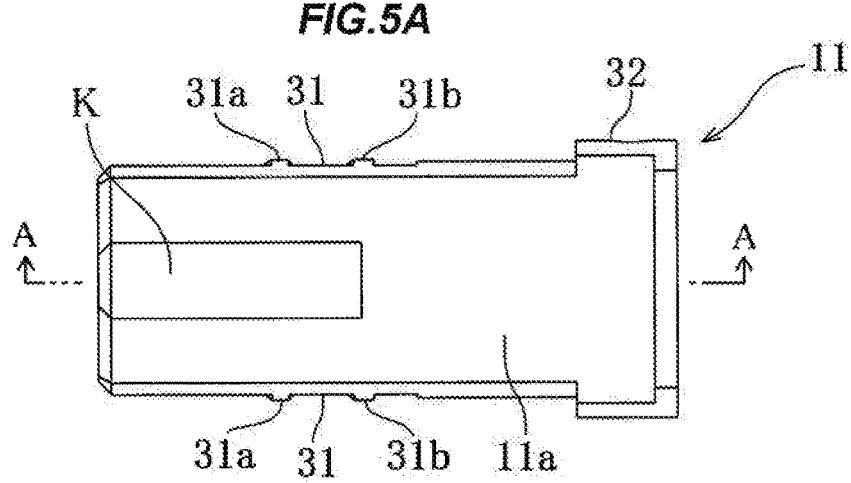
Figure 5B:
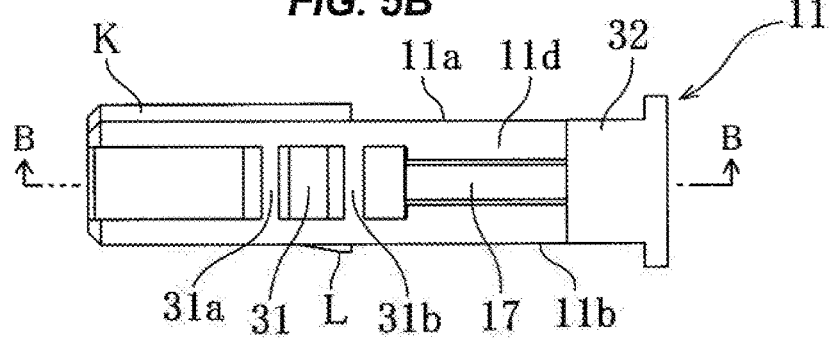
Figure 5C:
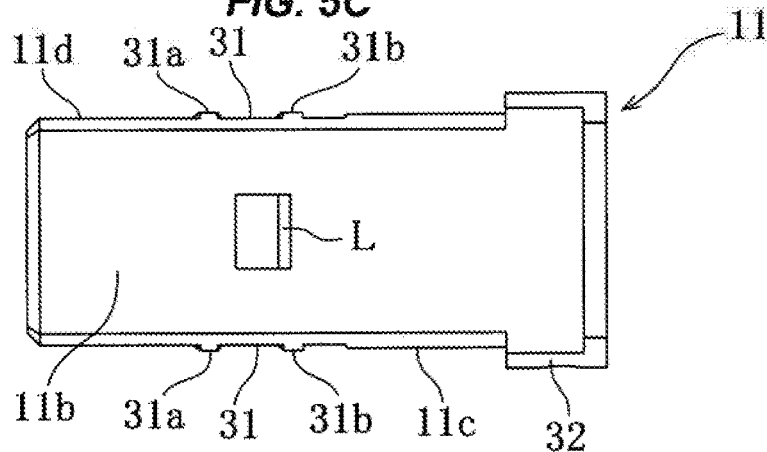
Figure 5D:
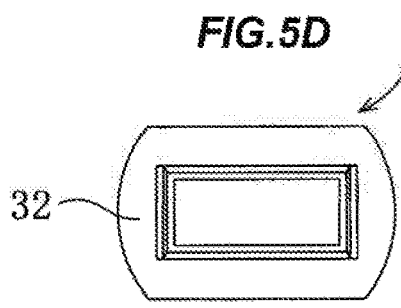
Figure 5E:
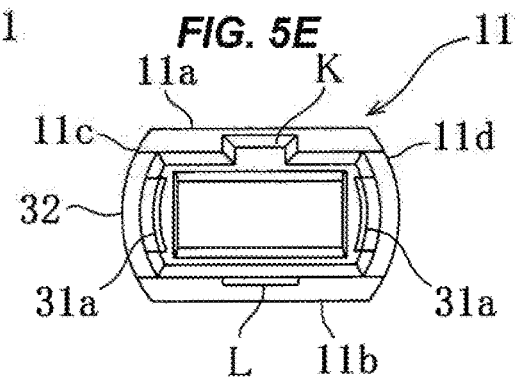
Figure 6A:
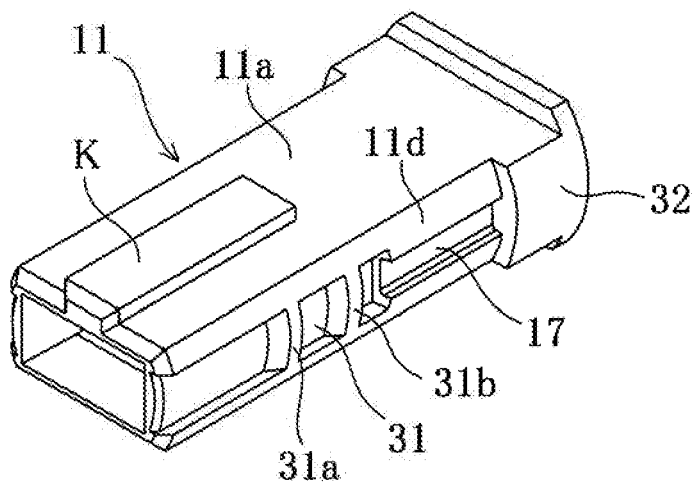
Figure 6B:
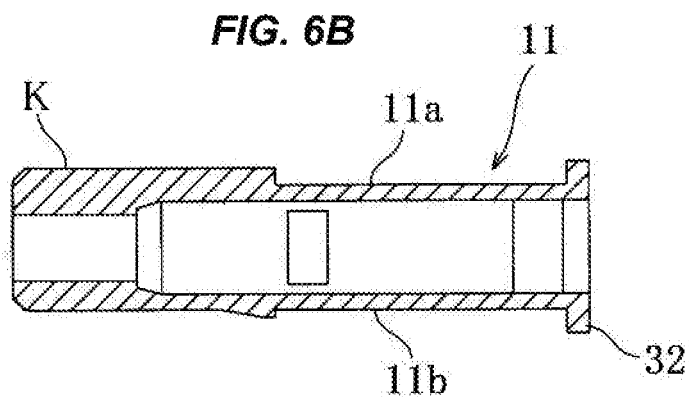
Figure 6C:
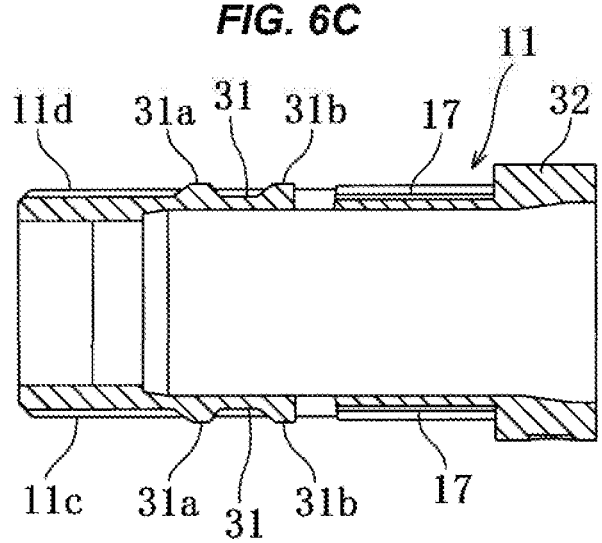
Figure 7A:
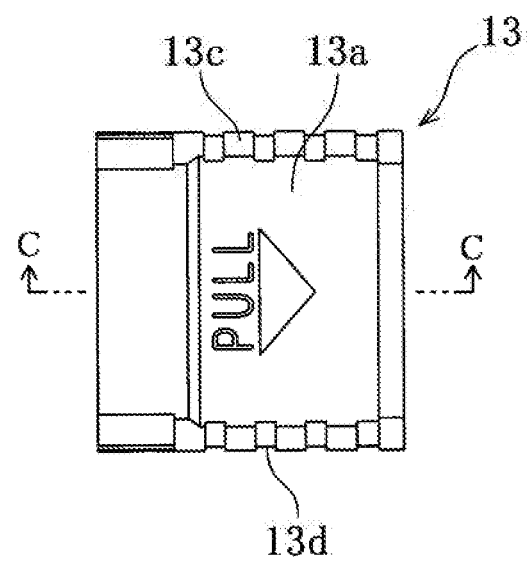
Figure 7B:
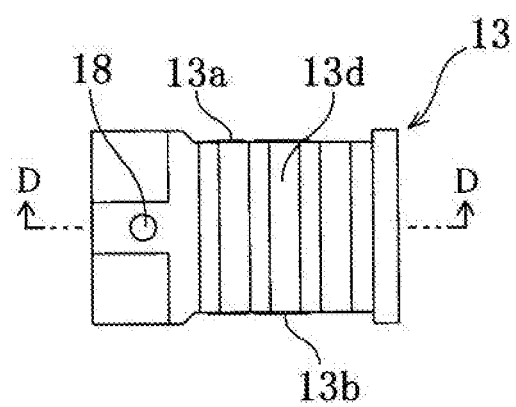
Figure 7C:
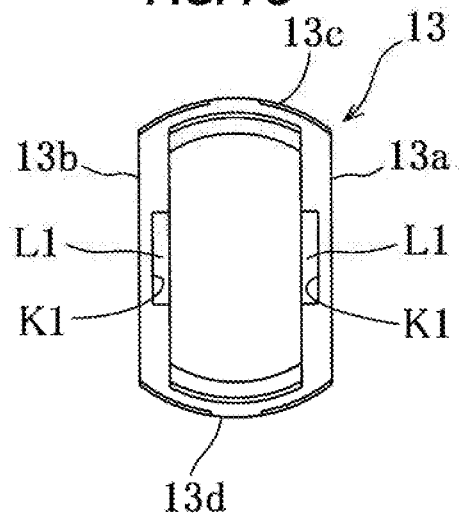
Figure 8A:
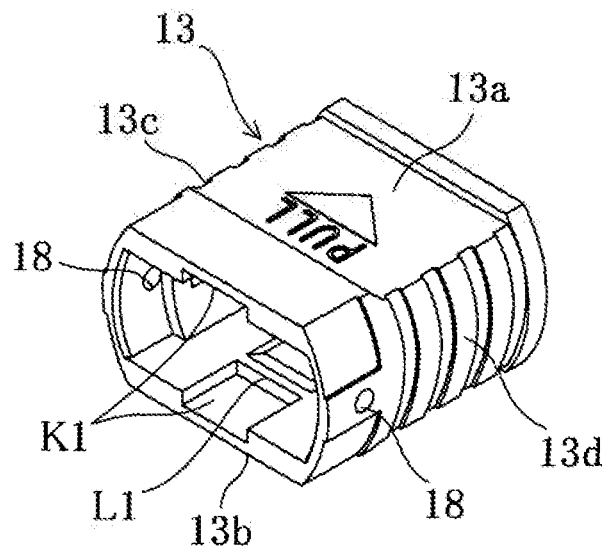
Figure 8B:
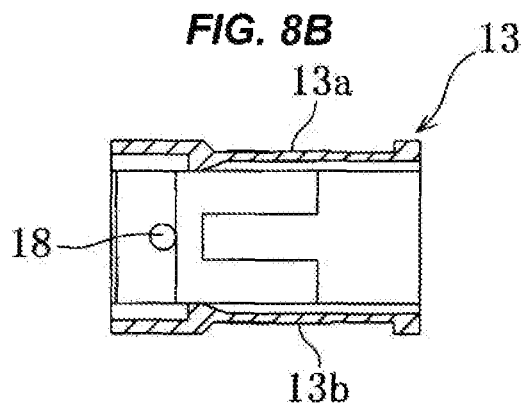
Figure 8C:
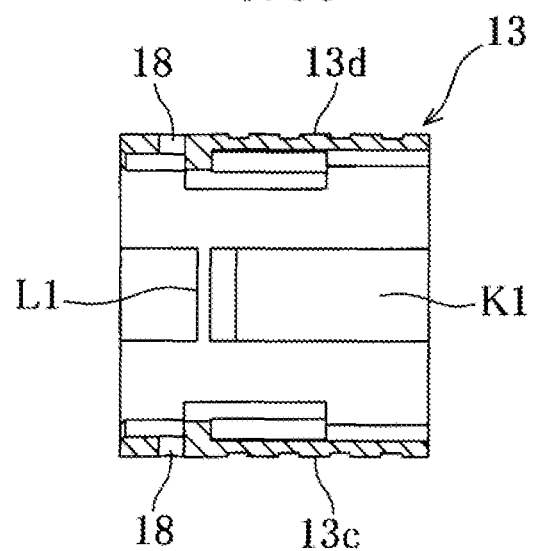

As shown in FIGS. 2A to 2C, a key groove 9 is formed at the center of an inner surface of the lower wall portion 1b of the one plug insertion and removal opening portion 1B of the adapter main body 1, and at the center of an inner surface of the upper wall portion 1a of the other plug insertion and removal opening portion 1A so as to extend to an inner center position of the adapter main body 1 along a sliding direction of the plug main body 10, the key groove 9 with which a key projection K formed in the housing 11 in the plug main body 10 side mentioned later engages. The key groove 9 has the same length as the key projection of the plug main body 10, and the plug main body 10 is arranged at a predetermined position of the adapter main body 1 when a front end of the key projection K is locked to a rear end of the key groove 9.

<Overall Structure of Plug Main Body>

The MPO type plug main body 10 has a sleeve-shaped housing 11, a ferrule 12 which is stored in a front end of the housing 11 and is attached to a front end of an optical fiber tape core wire (not shown), a spring 15 which elastically biases the ferrule 12 to a forward side of the plug main body 10 within the housing 11, a tubular coupling 13 which is outward inserted into a horizontally long recess 17 (refer to FIG. 3B) formed in the housing 11, is provided so as to be slidably movable in a range of movement secured in an axial direction of the housing in relation to the housing 11, and is elastically biased to a forward side of the plug main body 10 by a spring 16 arranged in the recess 17, a spring push 14 which is attached to an opposite rear end portion to the front end where the ferrule 12 of the housing 11 is provided, and supports in a locking manner a rear end of the spring 15, and a boot B which is outward installed to a rear end portion of the spring push 14 via a caulking ring 14A and a retention ring 14B, as shown in FIG. 3A.

<Overall Structure of Housing>

The housing 11 is formed into an approximately rectangular tube shape having a wide flange portion 32 at a rear end thereof, the key projections K are formed from the center of an outer surface in the upper wall portion 11a in the front end of the housing 11 toward an approximately center position along a longitudinal direction, as shown in FIGS. 5A to 5E and FIGS. 6A to 6C, thereby engaging with each of a key groove K1 in an inner surface of the upper wall portion 13a of the coupling 13 mentioned later and the key groove 9 of the adapter main body 1.

Further, as shown in FIGS. 5A to 5E, FIGS. 7A to 7C and FIGS. 8A to 8C, a hook stop L having an approximately wedge shape in a side view is provided in a protruding manner approximately at the center of the outer surface of the lower wall portion 11b in the housing 11, and engages at a forward sliding position with any of locking portions L1 which are formed in the inner surfaces of the upper and lower wall portions 13a and 13b of the coupling 13 mentioned later. Further, as shown in FIGS. 5A to 5E and FIGS. 6A to 6C, the recesses 17 are formed in a bilaterally symmetrical manner from a root of the flange portion 32 in the rear end side of the outer surfaces of the right and left wall portions 11c and 11d in the housing 11 toward a forward side, and a catch portion 31 formed into a concave groove shape between a pair of front and rear locking convex portions 31a and 31b is formed in a front side of the recess 17. The elastic locking portion 2 of the adapter main body 1 is structured such as to eat into and be locked to the catch portion 31 short of the rear side locking convex portion 31a after the locking projection 2a formed in a front end inner surface of the elastic locking portion 2 climbs over the forward side locking convex portion 31a, in a step that the plug main body 10 is inserted into the adapter main body 1.

<Overall Structure of Coupling>

In correspondence to the structure in which the left and right wall portions 1c and 1d of the adapter main body 1 are curved like the outward circular arc shape, the left and right wall portions 13c and 13d of the coupling 13 are curved like an outward circular arc shape, as shown in FIGS. 7A to 7C and FIGS. 8A to 8C. The left and right wall portions 13c and 13d are partially formed into a concavo-convex shape for preventing slip.

As shown in FIGS. 7A to 7C and FIGS. 8A to 8C, the key grooves K1 are formed in the inner surface of the upper and lower wall portions 13a and 13b of the coupling 13, and the key projections K at the center of the outer surface of the upper wall portion 11a in the front end of the housing 11 mentioned above engage therewith slidably. Further, the locking portion L1 is provided in the inner side of the key groove K1, and the hook stop L approximately at the center of the outer surface of the lower wall portion 11b in the housing 11 mentioned above engages with the locking portion L1 at a forward sliding position. Further, small holes 18 for inserting pins (not show) thereto are provided in the front end sides of the left and right wall portions 13c and 13d in the coupling 13, and the coupling 13 can be disassembled from the housing 11 by simultaneously inserting both pins of a clamp-shaped pin tool (not shown) having a pair of pins into the small holes 18. It is possible to disassemble by using two pins which can be inserted into the small holes 18 and inserting the pins from the small holes 18 without using the pin tool.

Next, a description will be given of an example of use of the adapter main body 1 according to the embodiment structured as mentioned above.

<Inserting Step>

Figure 9A:
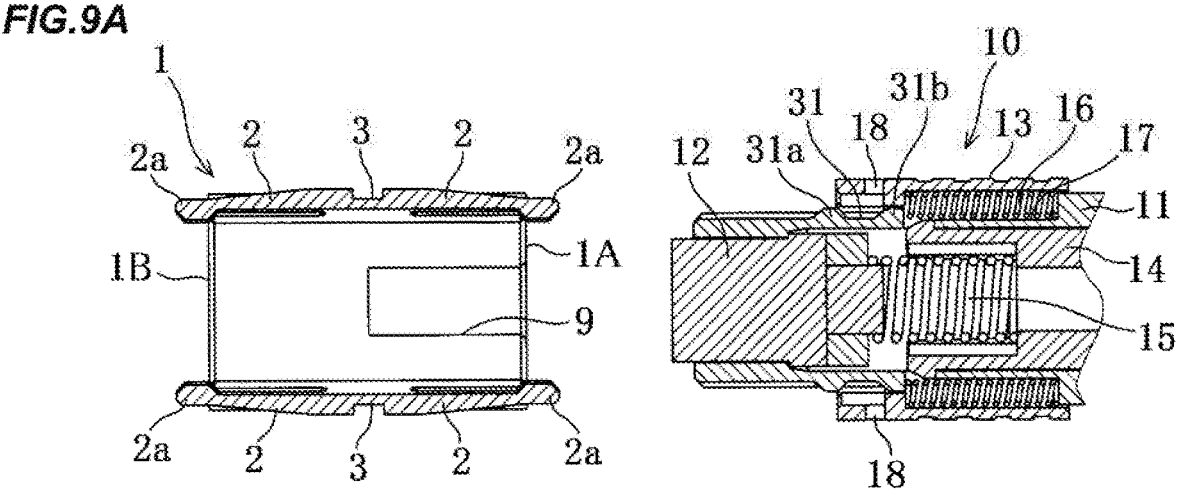

As shown in FIG. 9A, before the plug main body 10 is inserted into the adapter main body 1, the ferrule 12 is elastically biased to the forward side of the plug main body 10 by the spring 15 within the housing 11. Further, the coupling 13 is elastically biased to the forward side of the plug main body 10 by the spring 16 which is arranged within the recess 17 of the housing 11.

Figure 9B:
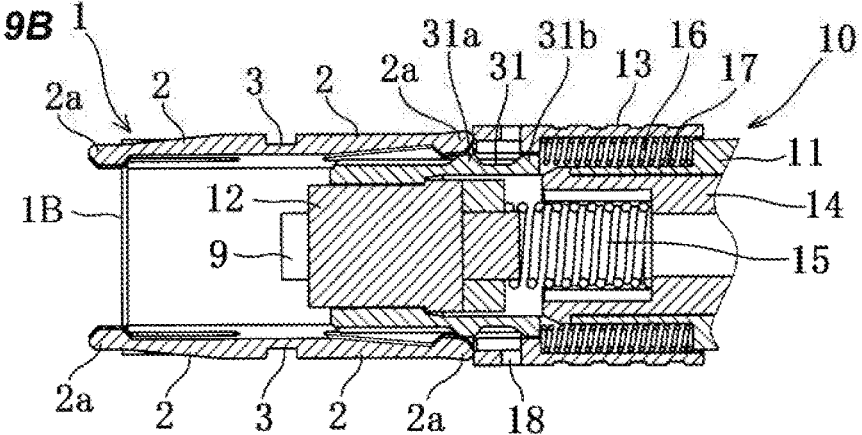

As shown in FIG. 9B, on the basis of the force insertion of the plug main body 10 into the adapter main body 1, the front end of the coupling 13 is pushed against the elastic biasing force of the spring 16 to the forward side of the plug main body 10 by the elastic locking portion 2 which is provided in the adapter main body 1, the coupling 13 is somewhat retracted rearward, and the catch portion 31 of the housing 11 is partly exposed. At this time, the locking projection 2a in the front end inner surface of the elastic locking portion 2 in the adapter main body 1 climbs over the locking convex portion 31a in the forward side.

Figure 9C:
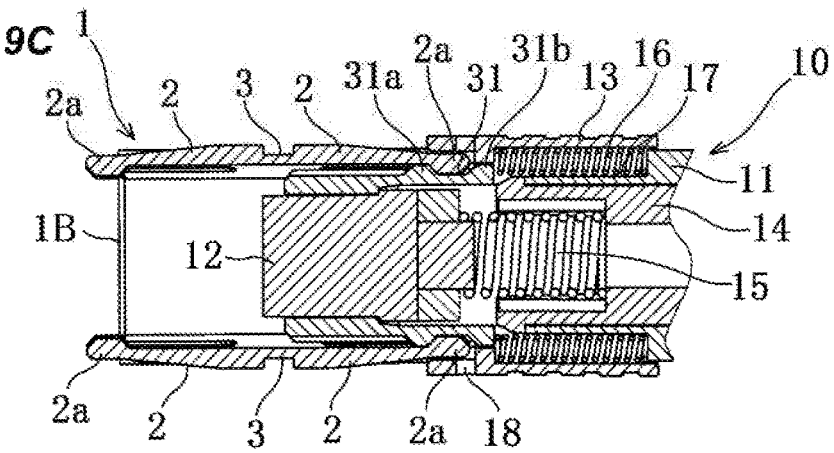

As shown in FIG. 9C, at the same time as the locking projection 2a of the elastic locking portion 2 provided in the adapter main body 1 climbs over the locking convex portion 31a in the forward side, the locking projection 2a of the elastic locking portion 2 eats into and is engaged with the catch portion 31 which is provided between a pair of front and rear locking convex portions 31a and 31b. At the same time as this, the coupling 13 slides forward on the basis of the elastic biasing to the forward side of the plug main body 10 by the spring 16 arranged within the recess 17 of the housing 11, and covers the upper side (outer side) of the locking projection 2a in the elastic portion 2 of the adapter main body 1, so that the plug main body 10 is fixed to a state in which the plug main body 10 is prevented from getting away from the adapter main body 1.

<Removing Step>

As shown in FIG. 10A, in the case that the coupling 13 is retracted somewhat rearward according to an appropriate manual operation against the elastic biasing force of the spring 16 to the forward side of the plug main body 10, the locking projection 2a of the elastic locking portion 2 in the plug main body 1 covered by the front end of the coupling 13 is released.

Consequently, as shown in FIG. 10B, in the case that the plug main body 10 is forcibly got out of the adapter main body 1, the locking projection 2a of the elastic locking portion 2 in the adapter main body 1 climbs over the locking convex portion 31a in the forward side and the elastic locking portion 2 is simultaneously bent and expanded outward, so that the locking projection 2a of the elastic locking portion 2 in the adapter main body 1 is extracted forward from the catch portion 31 which is provided between a pair of front and rear locking convex portions 31a and 31b.

At the same time, as shown in FIG. 10C, the coupling 13 slides back somewhat forward on the basis of the elastic biasing force of the spring 16 to the forward side of the plug main body 10, and again covers the partly exposed catch portion 31 in the housing 11. In this connection, this state coincides with the state before the inserting step in FIG. 9A.

Other Specific Use Example

A description will be given below of the other use example of the adapter main body 1 according to the structure mentioned above.

Figure 11:
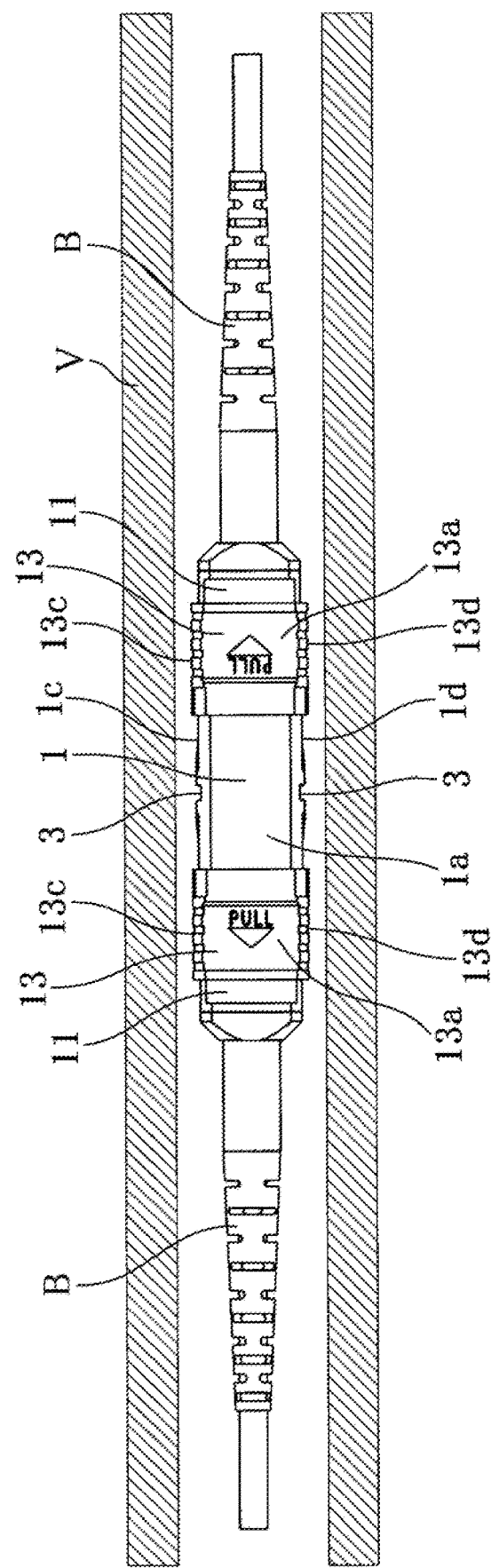
FIG. 11 is an explanatory view showing an example of a used state of an adapter main body according to the present invention in an inner portion of a piping by using a partial cross section.

FIG. 11 shows an example in the case where the adapter main body 1 having the structure mentioned above is used in an inner portion of a cylindrical piping V. In this case, since the plug main body 10 has the same size as a size around a body of the adapter main body 1, it is possible to avoid the obstacle (contact) caused by the adapter main body 1 in relation to the pipe inner wall due to the protrusion in the conventional adapter. For example, the piping V can be easily passed through the pipe inner portion when wiring in the inner portion of the piping V even in the case that the piping V is a narrow pipe.

Figure 12:
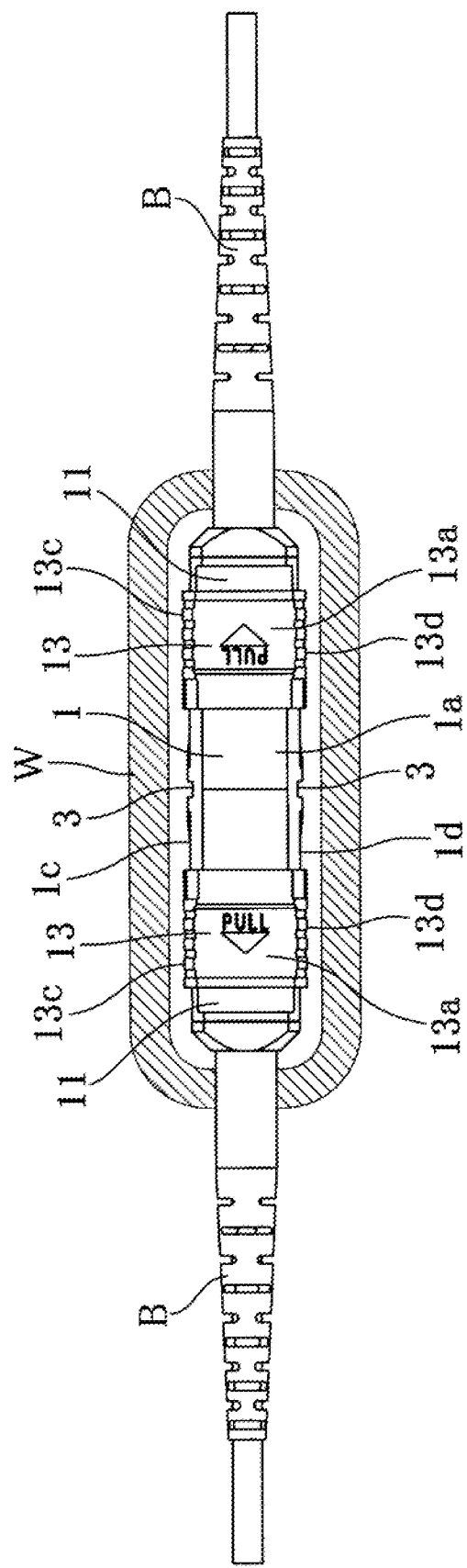
FIG. 12 is an explanatory view showing an example of a used state of the adapter main body according to the present invention in an inner portion of a relay box by using a partial cross section.

FIG. 12 shows an example in the case where the adapter main body 1 having the structure mentioned above is used in an inner portion of a capsule-shaped relay box W. In this case, since the plug main body 10 has the same size as the size around a body of the adapter main body 1 in the same manner as mentioned above, it is possible to avoid the obstacle (contact) caused by the adapter main body 1 in relation to the inner wall of the relay box.

Figure 13:
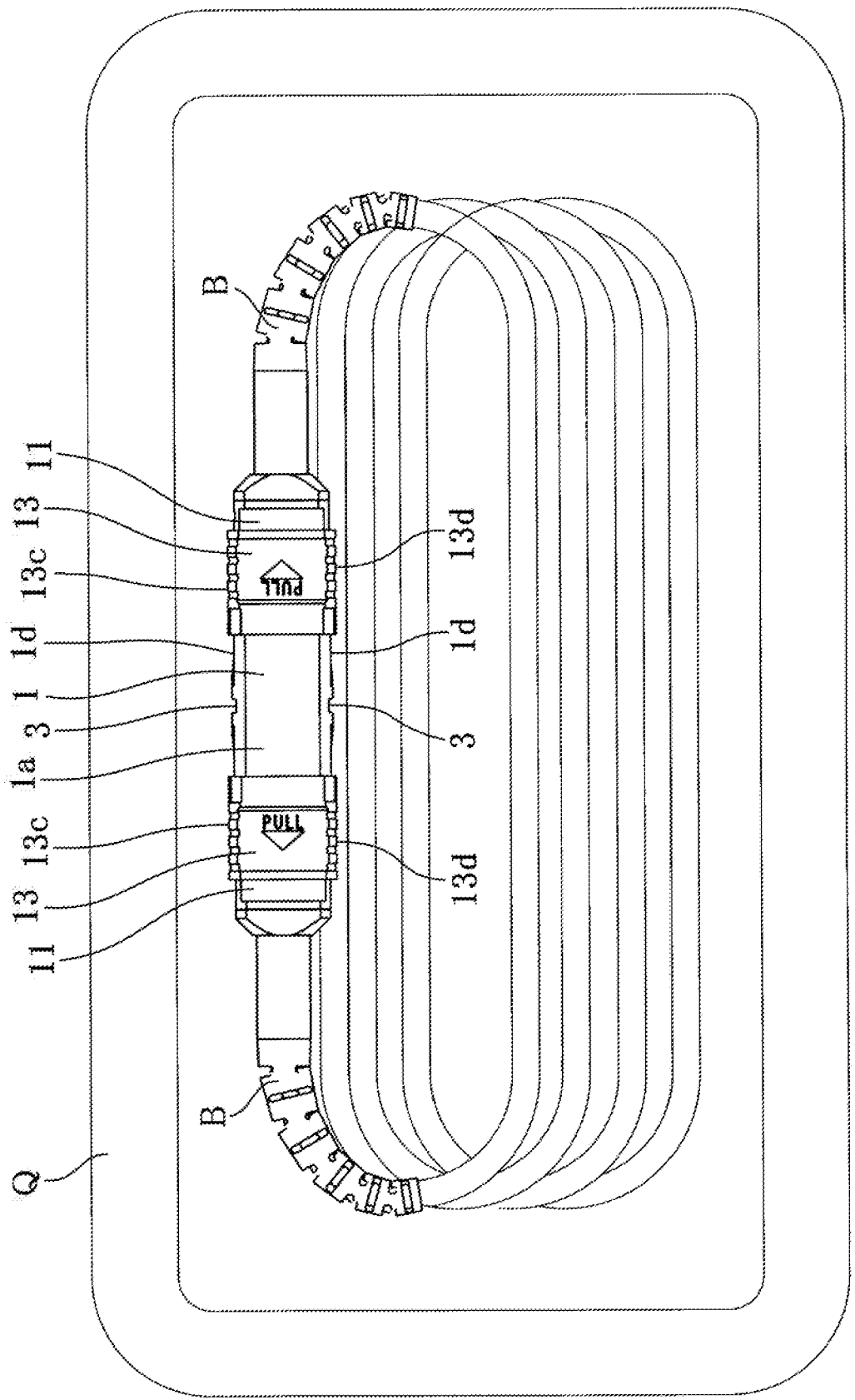
FIG. 13 is an explanatory view showing the other example of the used state of the adapter main body according to the present invention in the inner portion of the relay box by using a partial cross section.

FIG. 13 shows an example in the case where the adapter main body 1 having the structure mentioned above is used in an inner portion of a storage box Q (for example, an optical floor outlet). In this case, since the plug main body 10 has the same size as the size around a body of the adapter main body 1 in the same manner as mentioned above, a cord of the plug main body 10 is not caught on the adapter main body 1 when winding and storing within the storage box Q. Further, the storage box Q can be made compact.

Figure 14:
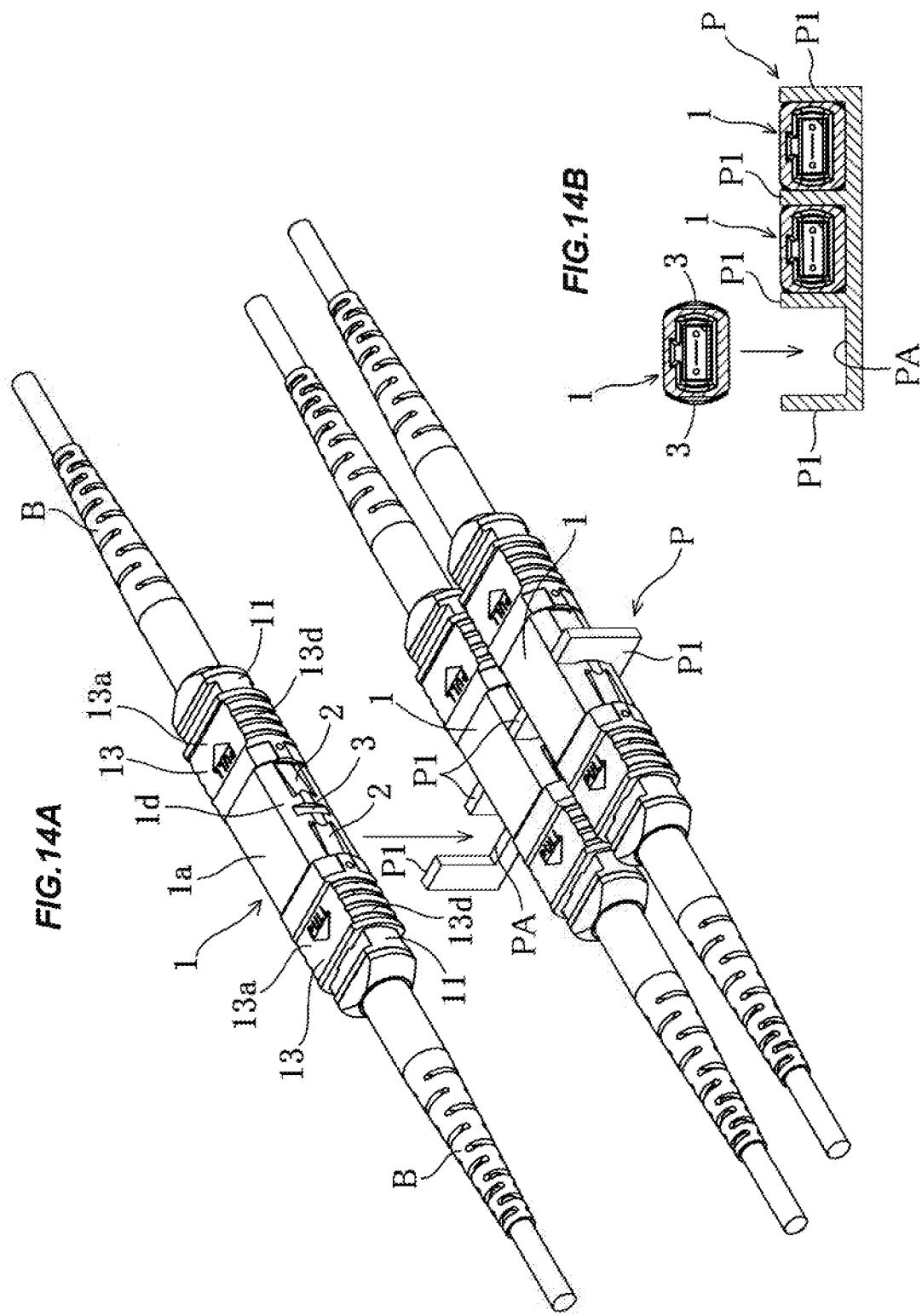
Figure 15:
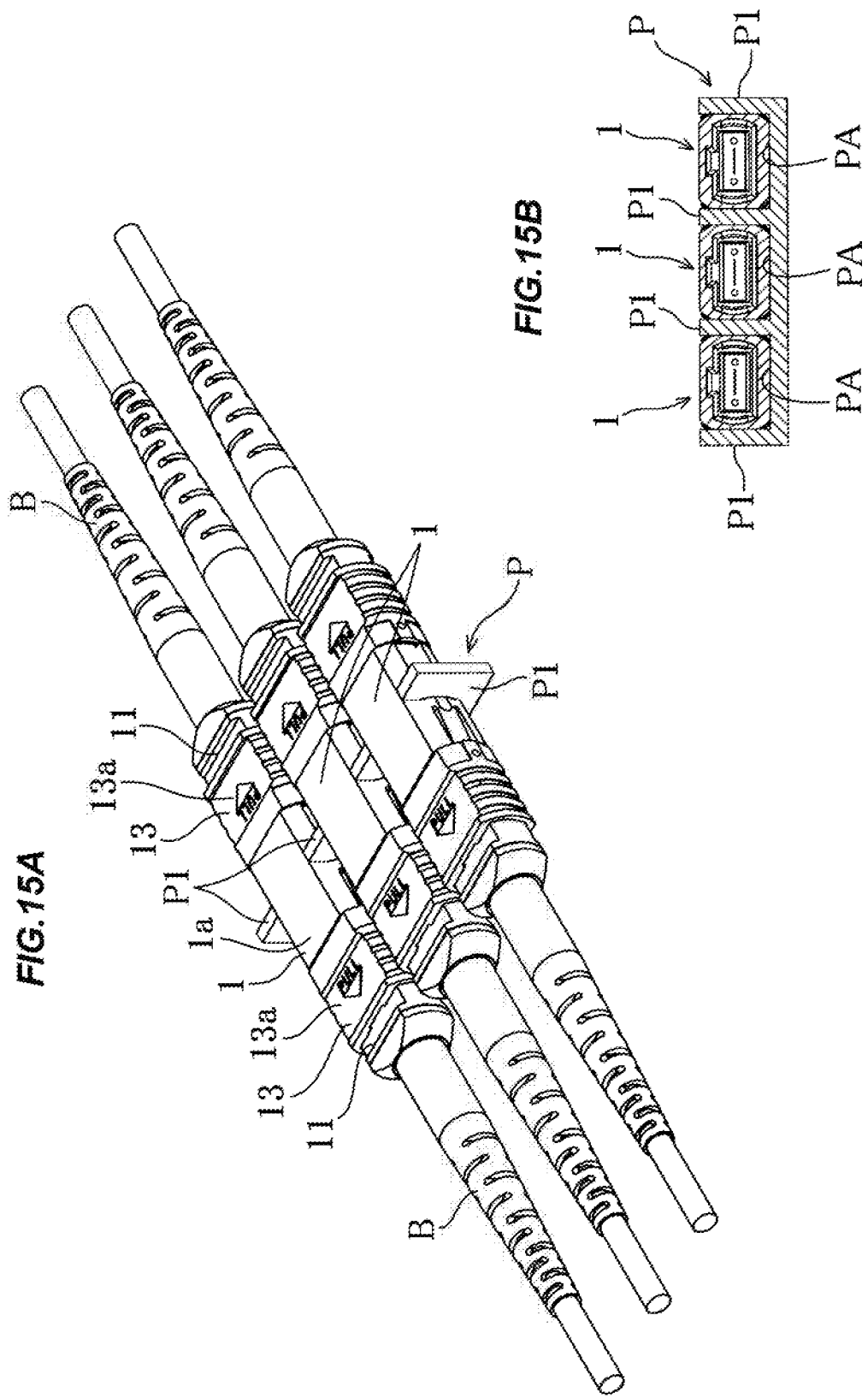

FIGS. 14A to 14B and FIGS. 15A to 15B show an example that the adapter main body 1 having the structure mentioned above is used for the high-density mounting panel P. In this case, the high-density mounting panel P is constructed by setting in a rising manner upward open C-shaped frame-like partition portions P1 at uniform intervals, and an angled groove PA is formed between the partition portions P1. As shown in FIGS. 14A and 14B, in the case that the adapter main body 1 is installed into the angles groove PA from the above, the notch portions 3 in the left and right wall portions 1c and 1d are closely attached and fitted to the partition portions P1 of the high-density mounting panel P.

Figure 16:
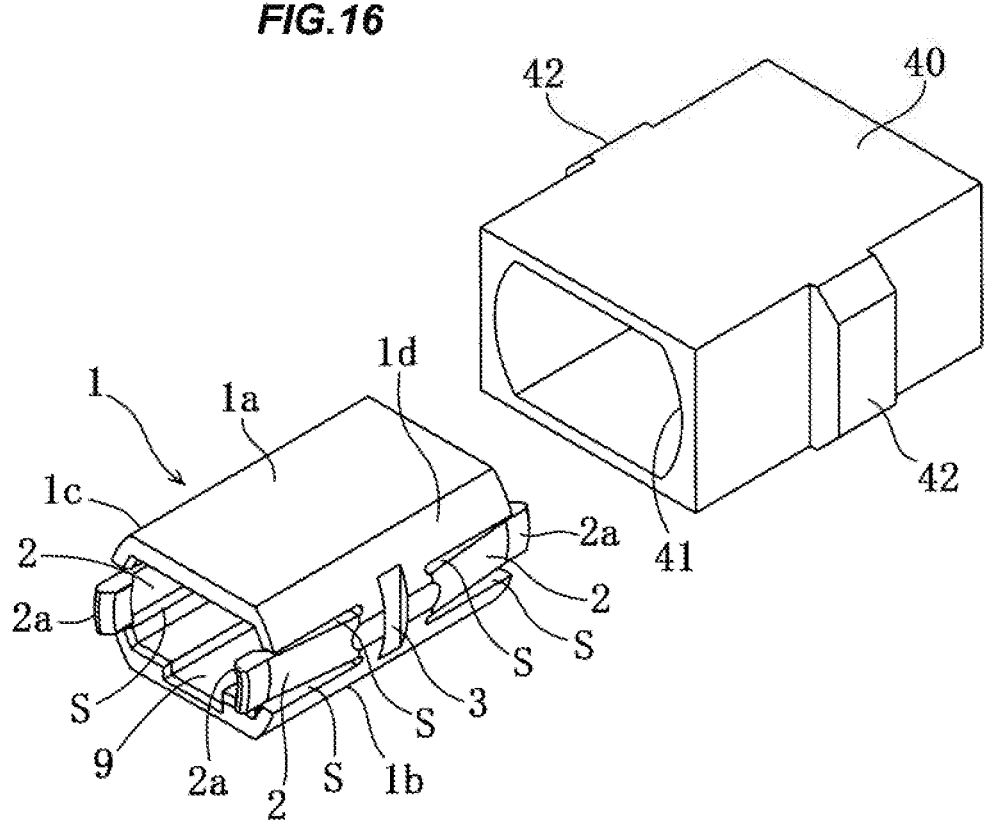
FIG. 16 is a perspective view of a state before the adapter main body is attached to an adapter cover, in the other used example of the adapter main body according to the present invention.
Figure 17A:
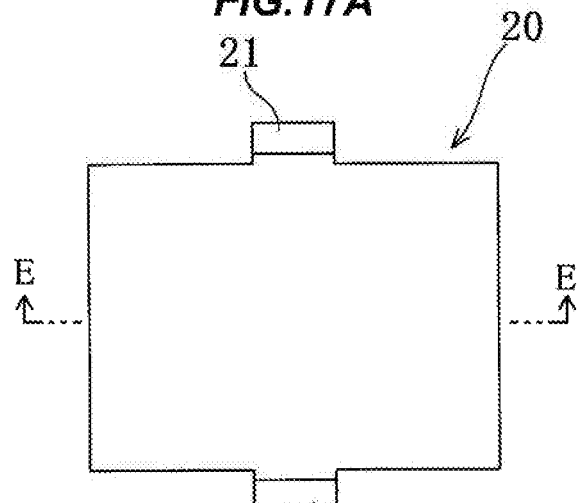
Figure 17B:
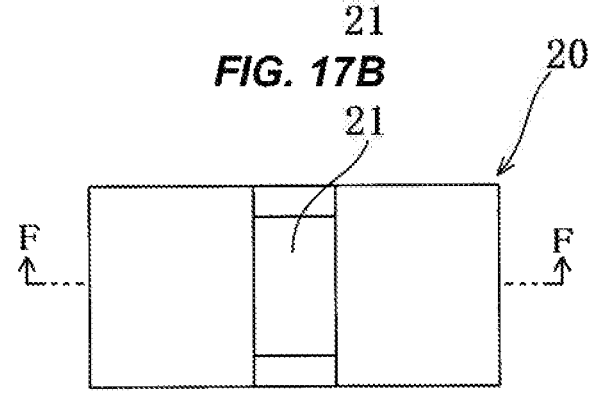
Figure 17C:
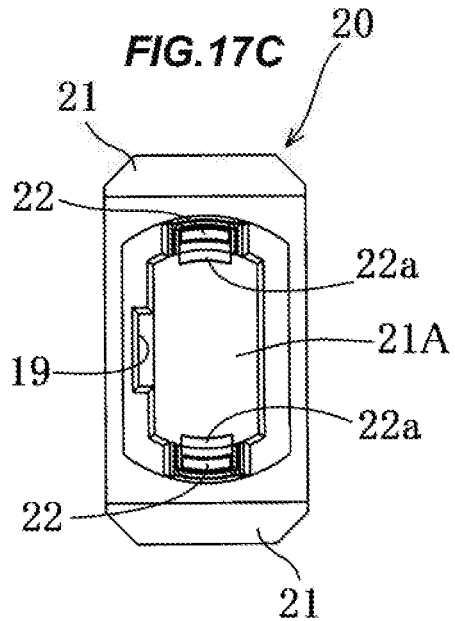
Figure 17D:
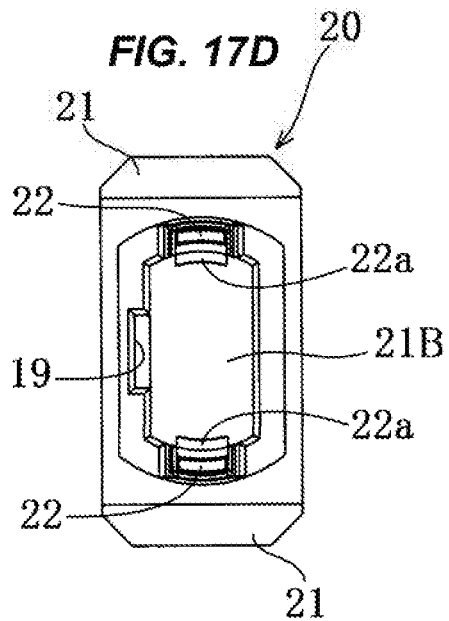
Figure 18A:
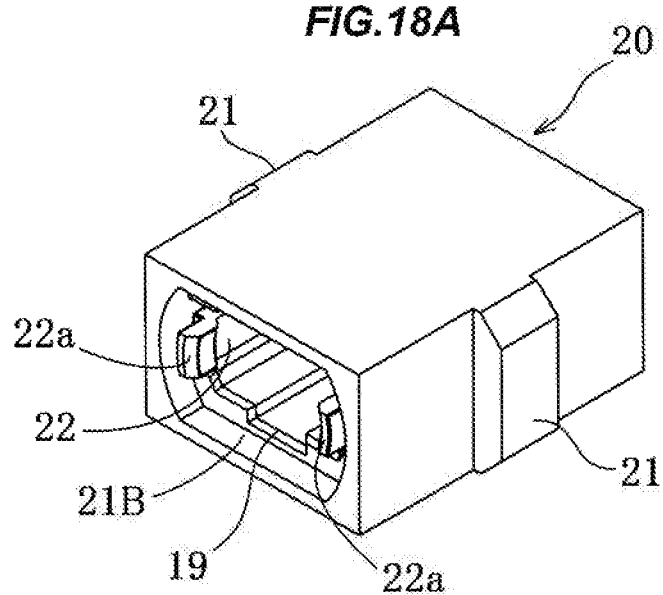
Figure 18B:
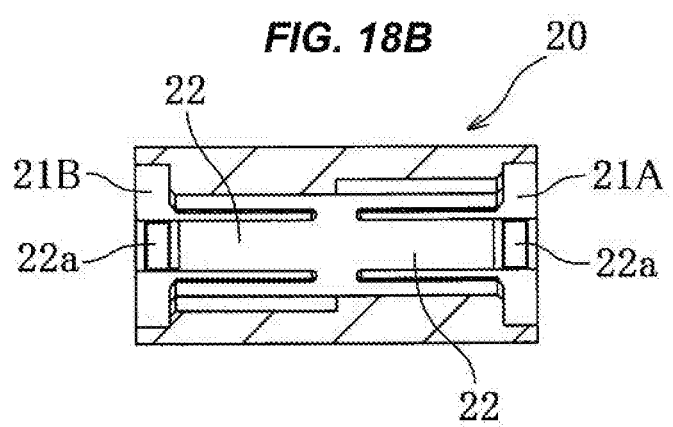
Figure 18C:
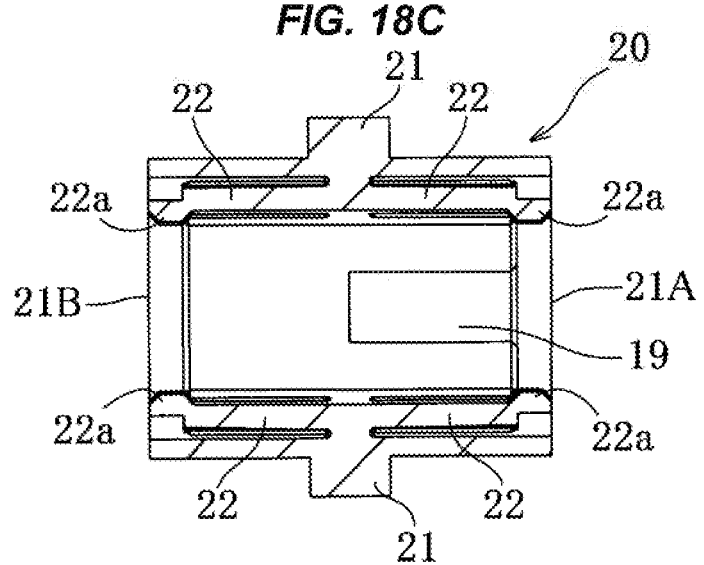
Figure 20A:
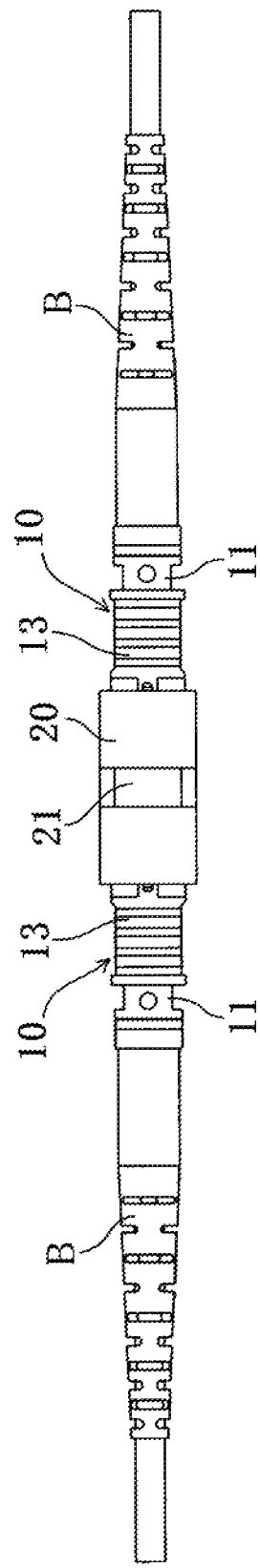
Figure 20B:
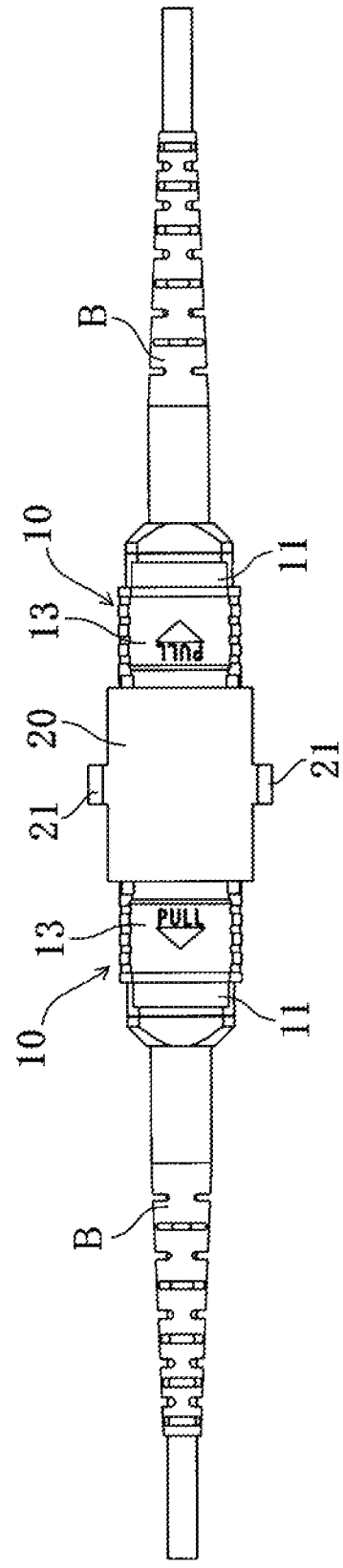

FIG. 16 shows an example in the case where the adapter main body 1 having the structure mentioned above is attached to a polygonal tubular adapter cover 40 and is used. More specifically, the adapter cover 40 shown in FIG. 16 has the same size as an outer shell shape of the conventional adapter, an accommodation portion 41 is provided in an inner portion of the adapter cover 40, and the adapter main body 1 having the structure mentioned above is stored and arranged at a predetermined position of the accommodation portion 41 and is used. In the drawing, reference numeral 42 denotes a locking projection for locking and fixing when being attached to the panel P. As mentioned above, even if it is necessary to attach the adapter main body 1 having a normal size to the panel P, the adapter cover 40 may be used, and usability is improved.

The invention claimed is:

1. An adapter for an MPO plug formed by an adapter main body, the adapter main body comprising:
 a plug insertion and removal opening portion provided for interconnecting a plug main body and communicating back and forth; and
 the plug main body comprising as primary members:
 a spring push which is provided in a rear end portion of the plug main body;
 a coupling which is mounted to the plug main body so as to be slidable back and forth in a forward side of the spring push, the coupling having upper and lower wall portions and right and left wall portions; and
 a spring which elastically biases the coupling to a forward side of the plug main body,
 wherein the adapter main body is formed by upper and lower wall portions which are approximately flush with the upper and lower wall portions of the coupling, and right and left wall portions which are approximately flush with the right and left wall portions of the coupling, and is provided in both front and rear ends of the right and left wall portions of the adapter main body with elastic locking portions which are provided so as to face to the plug insertion and removal opening portion side, wherein the locking of the adapter main body in relation to the elastic locking portion is retained by a forward movement of the coupling in dependence on an elastic biasing force of the spring to the forward side of the plug main body, and the locking of the adapter main body in relation to the elastic locking portion is disengaged by a rearward movement of the spring against the elastic biasing force to the forward side of the plug main body, thereby capable of getting out, wherein the elastic locking portion of the adapter main body is structured such that a locking projection is formed on a front end inner surface thereof, a catch portion formed into a concave groove shape between a pair of front and rear locking convex portions is provided in a protruding manner in a front end of the plug main body, and the locking projection formed in the front end inner surface of the elastic locking portion eats into and locked to the catch portion which is exposed by the coupling front end pressed by the elastic locking portion against the elastic biasing force of the spring to the forward side of the plug main body after climbing over the locking convex portion in the forward side, on the basis of a forced insertion of the plug main body into the adapter main body.

2. The adapter for the MPO plug according to claim 1, wherein a polygonal tubular adapter cover having an accommodation portion in its inner portion is provided, and the adapter main body is stored and arranged at a predetermined position of the accommodation portion of the adapter cover.

3. The adapter for the MPO plug according to claim 1, wherein the adapter main body is integrally formed by a plastic member which is a thin plate, has elasticity and has light weight.

4. An adapter for an MPO plug formed by an adapter main body, the adapter main body comprising:
 a plug insertion and removal opening portion provided for interconnecting a plug main body and communicating back and forth; and
 the plug main body comprising as primary members:
 a spring push which is provided in a rear end portion of the plug main body;
 a coupling which is mounted to the plug main body so as to be slidable back and forth in a forward side of the spring push, the coupling having upper and lower wall portions and right and left wall portions; and
 a spring which elastically biases the coupling to a forward side of the plug main body,
 wherein the adapter main body is formed by upper and lower wall portions which are approximately flush with the upper and lower wall portions of the coupling, and right and left wall portions which are approximately flush with the right and left wall portions of the coupling, and is provided in both front and rear ends of the right and left wall portions of the adapter main body with elastic locking portions which are provided so as to face to the plug insertion and removal opening portion side,
 wherein the locking of the adapter main body in relation to the elastic locking portion is retained by a forward movement of the coupling in dependence on an elastic biasing force of the spring to the forward side of the plug main body, and the locking of the adapter main body in relation to the elastic locking portion is disengaged by a rearward movement of the spring against the elastic biasing force to the forward side of the plug main body, thereby capable of getting out, and
 wherein vertical groove-shaped notch portions are provided at the centers of outer surface portions of the right and left wall portions in the adapter main body, the vertical groove-shaped notch portions fitting to a predetermined insertion position of a panel for mounting at a high density.

5. The adapter for the MPO plug according to claim 4, wherein the notch portions are fitted to partition portions of the panel for mounting at the high density, the partition portions being formed into an upward open C-shaped frame shape and provided in a rising manner at uniform intervals.

6. The adapter for the MPO plug according to claim 4, wherein a polygonal tubular adapter cover having an accommodation portion in its inner portion is provided, and the adapter main body is stored and arranged at a predetermined position of the accommodation portion of the adapter cover.

7. The adapter for the MPO plug according to claim 4, wherein the adapter main body is integrally formed by a plastic member which is a thin plate, has elasticity and has light weight.

8. An adapter for an MPO plug formed by an adapter main body, the adapter main body comprising:
 a plug insertion and removal opening portion provided for interconnecting a plug main body and communicating back and forth; and
 the plug main body comprising as primary members:
 a spring push which is provided in a rear end portion of the plug main body;
 a coupling which is mounted to the plug main body so as to be slidable back and forth in a forward side of the spring push, the coupling having upper and lower wall portions and right and left wall portions; and
 a spring which elastically biases the coupling to a forward side of the plug main body,
 wherein the adapter main body is formed by upper and lower wall portions which are approximately flush with the upper and lower wall portions of the coupling, and right and left wall portions which are approximately flush with the right and left wall portions of the coupling, and is provided in both front and rear ends of the right and left wall portions of the adapter main body with elastic locking portions which are provided so as to face to the plug insertion and removal opening portion side,
 wherein the locking of the adapter main body in relation to the elastic locking portion is retained by a forward movement of the coupling in dependence on an elastic biasing force of the spring to the forward side of the plug main body, and the locking of the adapter main body in relation to the elastic locking portion is disengaged by a rearward movement of the spring against the elastic biasing force to the forward side of the plug main body, thereby capable of getting out, and
 wherein the adapter main body is structured such that a key groove with which a key projection in the plug main body side engages is formed to an inside center portion of the adapter main body along a sliding direction of the plug main body, at the center of an inner surface of a lower wall portion of the one plug insertion and removal opening portion and the center of an inner surface of an upper wall portion of the other plug insertion and removal opening portion, the key projection of the plug main body has the same length as that of the key groove, a front end of the key projection is locked to a rear end of the key groove, and the plug main body is arranged at a predetermined position of the adapter main body.

9. The adapter for the MPO plug according to claim 8, wherein a polygonal tubular adapter cover having an accommodation portion in its inner portion is provided, and the adapter main body is stored and arranged at a predetermined position of the accommodation portion of the adapter cover.

10. The adapter for the MPO plug according to claim 8, wherein the adapter main body is integrally formed by a plastic member which is a thin plate, has elasticity and has light weight.

\* \* \* \* \*